(12) United States Patent
Rogren et al.

(10) Patent No.: US 11,298,875 B2
(45) Date of Patent: Apr. 12, 2022

(54) JETTED MATERIAL PRINTER WITH PRESSURE-ASSISTED FLUID EXTRACTION

(71) Applicant: Sakuu Corporation, San Jose, CA (US)

(72) Inventors: Philip Eugene Rogren, Half Moon Bay, CA (US); Morteza Vatani, Los Gatos, CA (US); Ronald Anthony Rojeski, San Jose, CA (US)

(73) Assignee: SAKUU CORPORATION, San Jose, CA (US)

( * ) Notice: Subject to any disclaimer, the term of this patent is extended or adjusted under 35 U.S.C. 154(b) by 0 days.

(21) Appl. No.: 17/198,570

(22) Filed: Mar. 11, 2021

(65) Prior Publication Data

US 2021/0379821 A1  Dec. 9, 2021

Related U.S. Application Data

(62) Division of application No. 17/122,944, filed on Dec. 15, 2020.
(Continued)

(51) Int. Cl.
*B29C 64/147* (2017.01)
*B33Y 10/00* (2015.01)
(Continued)

(52) U.S. Cl.
CPC ......... *B29C 64/147* (2017.08); *B29C 64/245* (2017.08); *B33Y 10/00* (2014.12);
(Continued)

(58) Field of Classification Search
CPC ..... B29C 64/147; B29C 64/112; B29C 64/40; B29C 64/245; B41J 11/0005;
(Continued)

(56) References Cited

U.S. PATENT DOCUMENTS 3,447,247 A * 6/1969 Daane ...................... D21F 5/00
                                                    34/122
3,956,790 A   5/1976 Ishiwata
(Continued)

FOREIGN PATENT DOCUMENTS

KR   10-2017-0003935 A   1/2017
WO        2017/156623 A1  9/2017
(Continued)

OTHER PUBLICATIONS

International Search Report and Written Opinion for PCT/US2019/031171 dated Jul. 17, 2019, 9 pages.
(Continued)

*Primary Examiner* — Philip C Tucker
*Assistant Examiner* — Jimmy R Smith, Jr.
(74) *Attorney, Agent, or Firm* — NovoTechIP International PLLC

(57) ABSTRACT

A three-dimensional (3D) inkjet printer is configured to build up an object by printing a series of layers and stacking them to form the object. In order to speed printing, drying of each layer is accelerated by using a pressure differential to extract liquid vehicle from the ink, and by moving the printed layer away from the inkjet print heads before drying so that the inkjet print heads may print the next layer. The dried printed layer may also be conditioned and/or cured. Dried printed layers are stacked at a build station to assemble the finished object.

17 Claims, 17 Drawing Sheets

Related U.S. Application Data

(60) Provisional application No. 63/034,317, filed on Jun. 3, 2020.

(51) Int. Cl.

| | | |
|---|---|---|
| *B41J 11/00* | (2006.01) | |
| *B29C 64/245* | (2017.01) | |
| *B33Y 30/00* | (2015.01) | |
| *B29C 64/393* | (2017.01) | |
| *B33Y 50/02* | (2015.01) | |

(52) U.S. Cl.
CPC ............ *B33Y 30/00* (2014.12); *B41J 11/002* (2013.01); *B41J 11/0005* (2013.01); *B41J 11/0022* (2021.01); *B41J 11/0024* (2021.01); *B29C 64/393* (2017.08); *B33Y 50/02* (2014.12)

(58) Field of Classification Search
CPC ... B41J 11/0024; B41J 11/002; B41J 11/0022; B33Y 30/00
See application file for complete search history.

(56) References Cited

U.S. PATENT DOCUMENTS

| | | | | |
|---|---|---|---|---|
| 5,896,154 | A * | 4/1999 | Mitani | B41J 11/0024 347/102 |
| 6,076,652 | A | 6/2000 | Head, III | |
| 6,214,279 | B1 * | 4/2001 | Yang | B22F 1/0003 264/482 |
| 6,397,488 | B1 | 6/2002 | Brinkly | |
| 6,596,224 | B1 * | 7/2003 | Sachs | B22F 10/10 419/6 |
| 8,337,953 | B2 * | 12/2012 | Nakazawa | B41J 11/002 427/261 |
| 10,076,869 | B2 | 9/2018 | Liu et al. | |
| 2004/0081475 | A1 | 4/2004 | Phillips et al. | |
| 2008/0179771 | A1 | 7/2008 | Miao et al. | |
| 2008/0192093 | A1 | 8/2008 | Pinard et al. | |
| 2009/0226833 | A1 | 9/2009 | Sato et al. | |
| 2010/0038807 | A1 | 2/2010 | Brodkin et al. | |
| 2013/0075013 | A1 | 3/2013 | Chillscyzn et al. | |
| 2013/0075022 | A1 | 3/2013 | Chillscyzn et al. | |
| 2013/0077996 | A1 | 3/2013 | Hanson et al. | |
| 2013/0218241 | A1 * | 8/2013 | Savoy | A61F 7/007 607/98 |
| 2013/0272746 | A1 | 10/2013 | Hanson et al. | |
| 2015/0227070 | A1 | 8/2015 | Martin | |
| 2016/0067922 | A1 | 3/2016 | Voris et al. | |
| 2016/0200084 | A1 | 7/2016 | Hays et al. | |
| 2017/0050379 | A1 | 2/2017 | Houben et al. | |
| 2017/0299973 | A1 | 10/2017 | Frauens | |
| 2018/0034038 | A1 | 2/2018 | Rogren | |
| 2018/0043619 | A1 | 2/2018 | Kim et al. | |
| 2018/0085993 | A1 | 3/2018 | Biskop et al. | |
| 2018/0229425 | A1 | 8/2018 | Sheinman | |
| 2018/0294412 | A1 | 10/2018 | Cui | |
| 2019/0375159 | A1 | 12/2019 | Rogren | |
| 2020/0108553 | A1 | 4/2020 | Rogren | |
| 2020/0108650 | A1 | 4/2020 | Zavada et al. | |
| 2020/0171699 | A1 | 6/2020 | Ritzberger et al. | |
| 2020/0171752 | A1 | 6/2020 | Rogren | |
| 2020/0368965 | A1 * | 11/2020 | Richards | G03G 15/224 |

FOREIGN PATENT DOCUMENTS

| | | |
|---|---|---|
| WO | 2019/152797 A1 | 8/2019 |
| WO | 2019/236236 A1 | 12/2019 |
| WO | 2020/076734 A1 | 4/2020 |
| WO | 2020/117498 A1 | 6/2020 |

OTHER PUBLICATIONS

International Search Report and Written Opinion for PCT/US2019/055061 dated Jan. 2, 2020, 12 pages.
International Search Report and Written Opinion for PCT/US2019/062839 dated Feb. 7, 2020, 14 pages.
International Search Report and Written Opinion dated Jul. 2, 2021 in corresponding or PCT/US2021/027893, 12 pages.

* cited by examiner

JETTED MATERIAL PRINTER WITH PRESSURE-ASSISTED FLUID EXTRACTION

This application is a divisional application of U.S. patent application Ser. No. 17/122,944 entitled "JETTED MATERIAL PRINTER WITH PRESSURE-ASSISTED FLUID EXTRACTION," filed Dec. 15, 2020, which claims the benefit of U.S. Provisional Application Ser. No. 63/034,317 entitled "FLUID EXTRACTION DEVICE FOR JETTED MATERIAL PRINTER," filed Jun. 3, 2020, the entireties of which are hereby incorporated by reference.

TECHNICAL FIELD

This application relates to three-dimensional (3D) printing using inkjet printers, particularly to the use of vacuum to extract liquid vehicle from printed layers for assembly.

BACKGROUND

Three-dimensional (3D) printing has generated a high degree of interest in the potential for a faster and more economical manufacturing approach since the first patents were granted over 30 years ago. To date, however, that potential has largely gone unfulfilled. Today, the majority of 3D printers are used to make demonstration parts or non-functional prototypes, most from a plastic material that is chosen primarily for compatibility with the printer rather than the materials requirement of the final part.

While jetted binder 3D printers are arguably the most efficient technology for creating a 3D printed object, one of their attributes, the ability to deposit relatively thick layers, limits its usefulness when precise thin layers are needed. Inkjet printing, while rapidly depositing large areas of ink, is restricted to layer thicknesses in the range of a few microns. The trade-off is that printed resolution is significantly finer than is possible with jetted binder printing.

While inkjet-based 3D printers have been the subject of study and development, the approach has not been commercially deployed in significant breath. Inkjet technology in 3D printing applications, as suggested above, offers limited deposition rates, which limit the economic practicality. Notwithstanding the slow build rates possible with pure inkjet technology, inkjet-based 3D printers possess major advantages. Specifically, inkjet printers are readily adapted to printing multiple different materials (colors) into a single printed layer. Inkjet printers can be easily controlled with respect to the amount of material in each drop and can achieve pixel sizes as small as 0.010 mm. Additionally, inkjet printers can print a complete layer very quickly, as fast as 1 second for an "A4" size sheet.

On the negative side, while inkjet printers can cover a lot of area per second, the volume per unit time, particularly in the context of a 3D printer, is very low. Currently available 3D printers based on inkjet technology are capable of depositing a few hundred cubic centimeters of active material per hour, which may be compared to jetted binder deposition rates as high as tens of liters per hour.

A need remains for a 3D printing system that can preserve the fine resolution of inkjet technology which substantially improving speed of printing.

SUMMARY

In one aspect, a three-dimensional (3D) printer includes a receiver device including a substrate, an inkjet print head configured to deposit an ink including a suspension of a particulate material in a liquid vehicle onto the substrate to form a printed layer, a removal system configured to use a pressure differential to remove a portion of the liquid vehicle from the printed layer to form a dried layer; and a transfer system configured to transfer the dried layer to a build station.

In another aspect, a method of three-dimensional (3D) printing includes depositing an ink onto a substrate with an inkjet print head to form a printed layer, the ink including a particulate material and a liquid vehicle, transporting the printed layer away from the inkjet print head, using a pressure differential to remove a portion of the liquid vehicle from the printed layer to form a dried printed layer, and transferring the dried printed layer to a build station to form a stack of printed layers.

In another aspect, an inkjet printer includes a receiver device including a substrate, an inkjet print head configured to deposit an ink including a suspension of a particulate material in a liquid vehicle onto the substrate to form a printed layer, and a removal system configured to use a pressure differential to remove a portion of the liquid vehicle from the printed layer.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

The drawing figures depict one or more implementations in accord with the present teachings, by way of example only, not by way of limitation. In the figures, like reference numerals refer to the same or similar elements. Furthermore, it should be understood that the drawings are not necessarily to scale.

DETAILED DESCRIPTION

Figure 1:
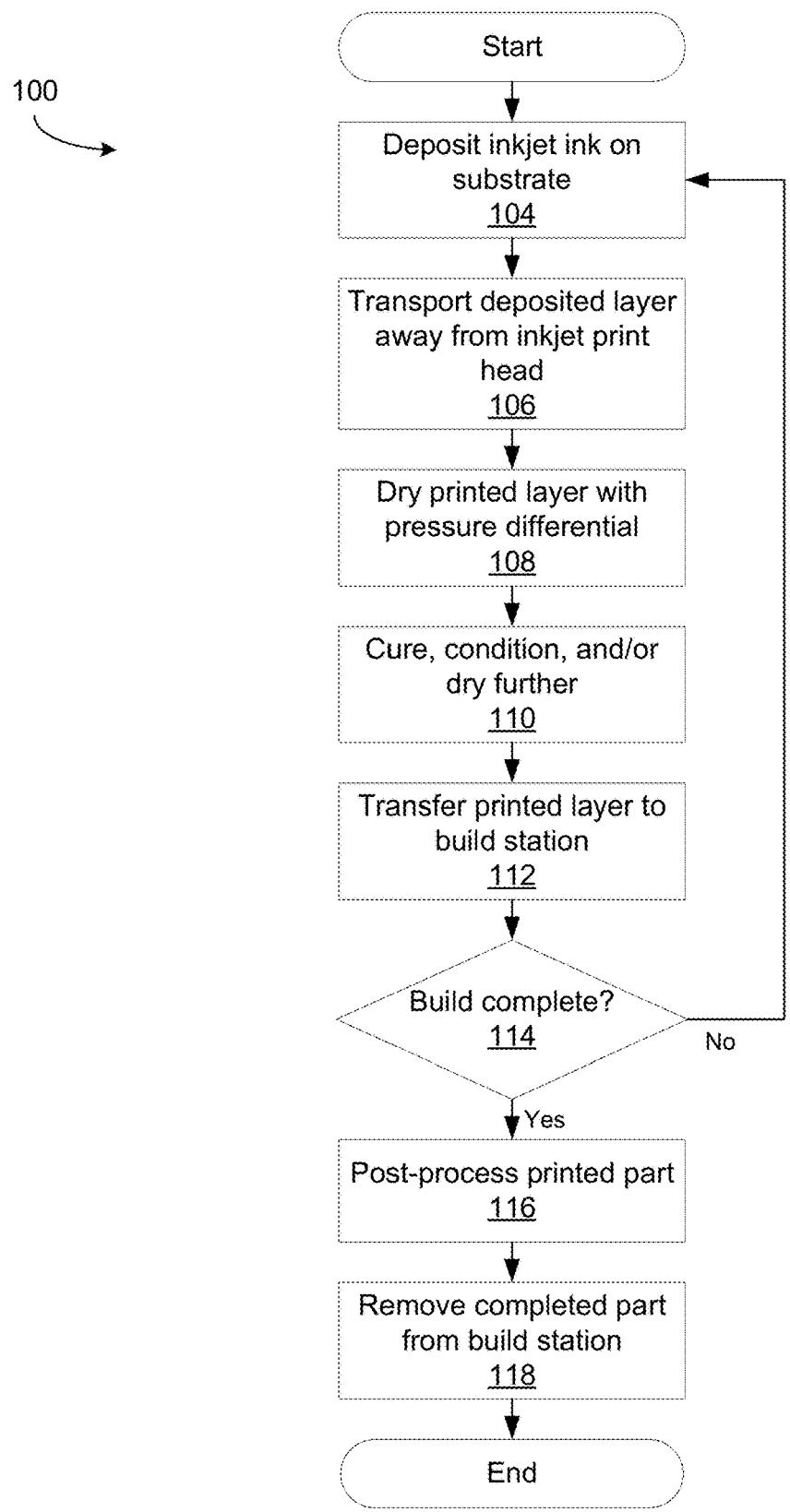
FIG. 1 is a control flow for a 3D inkjet printer.

In the following detailed description, numerous specific details are set forth by way of examples in order to provide a thorough understanding of the relevant teachings. However, it should be apparent that the present teachings may be practiced without such details. In other instances, well known methods, procedures, components, and/or circuitry have been described at a relatively high-level, without detail, in order to avoid unnecessarily obscuring aspects of the present teachings.

Inkjet print heads work most effectively with low-viscosity ink, for example ink with a viscosity of no more than about 40 centipoise (cP), which can dictate a very low loading of insoluble materials such as metals, ceramics or polymers. Typically, the volumetric loading of insoluble materials in inkjet ink is 20% or less. Binders may also make up 5% to 20% of the total volume of the ink, leaving 60% to 75% or more as liquid vehicle, much of which must be removed in order to achieve practical green density of at least 40% by volume of the active materials.

Jetted material printers can be used with inks that include materials that may be polymerized to a solid mass after deposition, an approach that is useful for making parts built largely of organic materials. While it may theoretically be possible to formulate a virtually 100% polymerizable material that may be jetted, it is unlikely that inks comprising solutions of inorganic materials will ever exceed around 20% by volume of persistent material. Therefore, if jetted material printers are ever to be practical for high speed 3D printing, they must be provided with a means of removing the majority of the liquid vehicle deposited during the printing cycle much more rapidly than can be accomplished by evaporation alone. The printer described herein provides just such a tool, augmenting or replacing evaporation by using an applied pressure differential drying technique, and in some implementations, enabling printing of successive layers while previous layers are drying.

The 3D inkjet printers described herein are designed to create printed objects, printed layers and printed parts using combinations of materials not typically associated with inkjet printing. These materials may be high performance engineering materials designed specifically to meet the engineering requirements of the final printed part, incorporated in inks specifically designed for use in inkjet print heads. These materials may include ceramic and metals as well as organic materials that may be included as particles suspended in a liquid vehicle.

Printing Process

A basic process for manufacturing a 3D printed part typically begins with a CAD file fully defining the structure, materials and specifications of the desired part. The part described in the CAD file may be sliced into print pattern layers, the thickness each layer determined by specifications for each position within the printed part, such as final thickness and pattern tolerance. Each layer may then be separated into regions, which may require different materials. Printer control instructions for each of the regions of different material requirement may then be transferred from the design file via input device and central processing unit and interface bus to appropriate print station control units of the jetted material printer system. As used herein, a "printed part" includes any assemblage of printed subparts or layers which may be fused together to form the part. Such an assemblage may be referred to as a "printed part" before or after fusing together its constituent parts. As used herein, a "printed layer" includes a layer of one or more materials, one voxel thick, which may have a horizontal design conforming to a design of a predetermined location within a desired printed part.

FIG. 1 depicts a method 100 of creating a 3D printed part at a highly abstracted level. Details of each step of the depicted method will be expanded as subsequent figures are described below. The method 100 begins by depositing inkjet ink onto a substrate (step 104) in a patterned layer using an inkjet print head as further described below. The deposited patterned layer is then transported away from the inkjet print head (step 106), and a pressure differential is applied in order to rapidly dry the printed layer (step 108). Optionally, the printed layer may also be conditioned, cured, and/or further dried (step 110). Once processing steps for the single printed layer are complete, the printed layer is transported to a build station, where it is transferred to a stack of previously printed layers (or, for the first layer printed, begins a new stack on the build station) (step 112). This process is repeated until all layers of the desired printed part have been transferred to the build station (conditional step 114). For some implementations, after all of the layers have been stacked at the build station, postprocessing on the printed part may be completed (step 116), for example by sintering together the stacked layers or by applying heat or another energy input in order to activate an adhesive from the conditioning step. Finally, the completed printed part may be removed from the build station (step 118).

Three-Dimensional Jetted Material Printer

Figure 2:
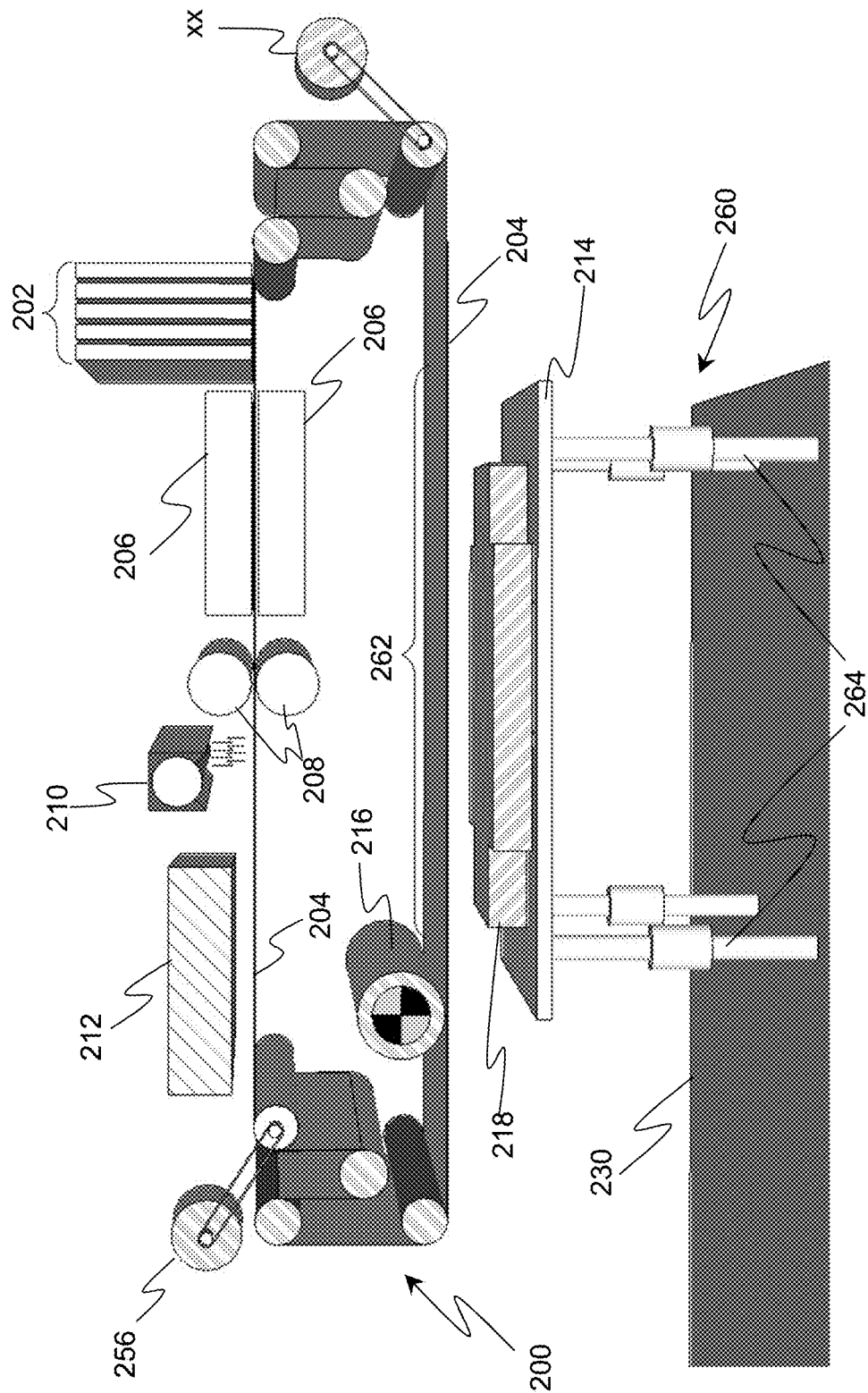
FIG. 2 is a drawing of a 3D inkjet printer.
Figure 3:
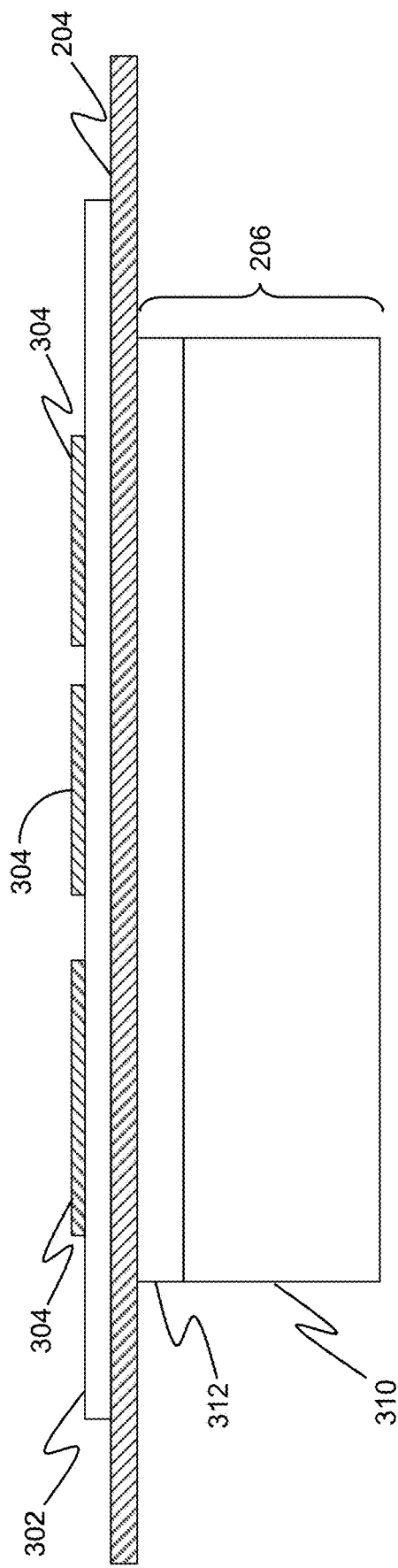
FIG. 3 is a drawing of layers of a receiver/carrier device as shown in FIG. 2.

With reference to FIG. 2 and FIG. 3, deposition of the patterned layer (step 104) starts by providing inkjet inks appropriate for each of the plurality of inkjet print heads 202 of the 3D inkjet printer 200 onto receiver device 204 (also referred to herein as carrier 204 or as receiver 204), depicted in FIG. 2 as a continuous belt. In other implementations, receiver device 204 may take other forms, such as individual carrier plates or an extended length of carrier material that may be cycled through the printer one time before being reconditioned or disposed of. Each one of the plurality of inkjet print heads 202 deposits ink in the predetermined pattern of a printed layer according to instructions received from a control system in communication with a computer, as further described below in connection with FIG. 14 and FIG. 15. The deposited inks form printed layer 304, visible in FIG. 3 atop receiver device 204 and permeable membrane 302, which will be further described below. Each of the plurality of inkjet material print heads 202 may be supplied with inkjet ink containing a same or different building material, each material conforming to a predetermined physical specification. Each of the plurality of inkjet print heads may be of the types known in the art and supplied by companies such as Xaar, Hewlett Packard and Konica Minolta (e.g., piezo heads, thermal heads, or valve-based heads). The plurality of print heads may all be of the same type, or each of the plurality of print heads may be of a type that is different from one or more of the other ones of the plurality of print heads. Print heads 202 may be configured to print directly to a receiver device 204 in order to create a 3D printed layer thereon, or onto a permeable membrane 302 placed on receiver device 204 as further discussed below.

Figure 15:
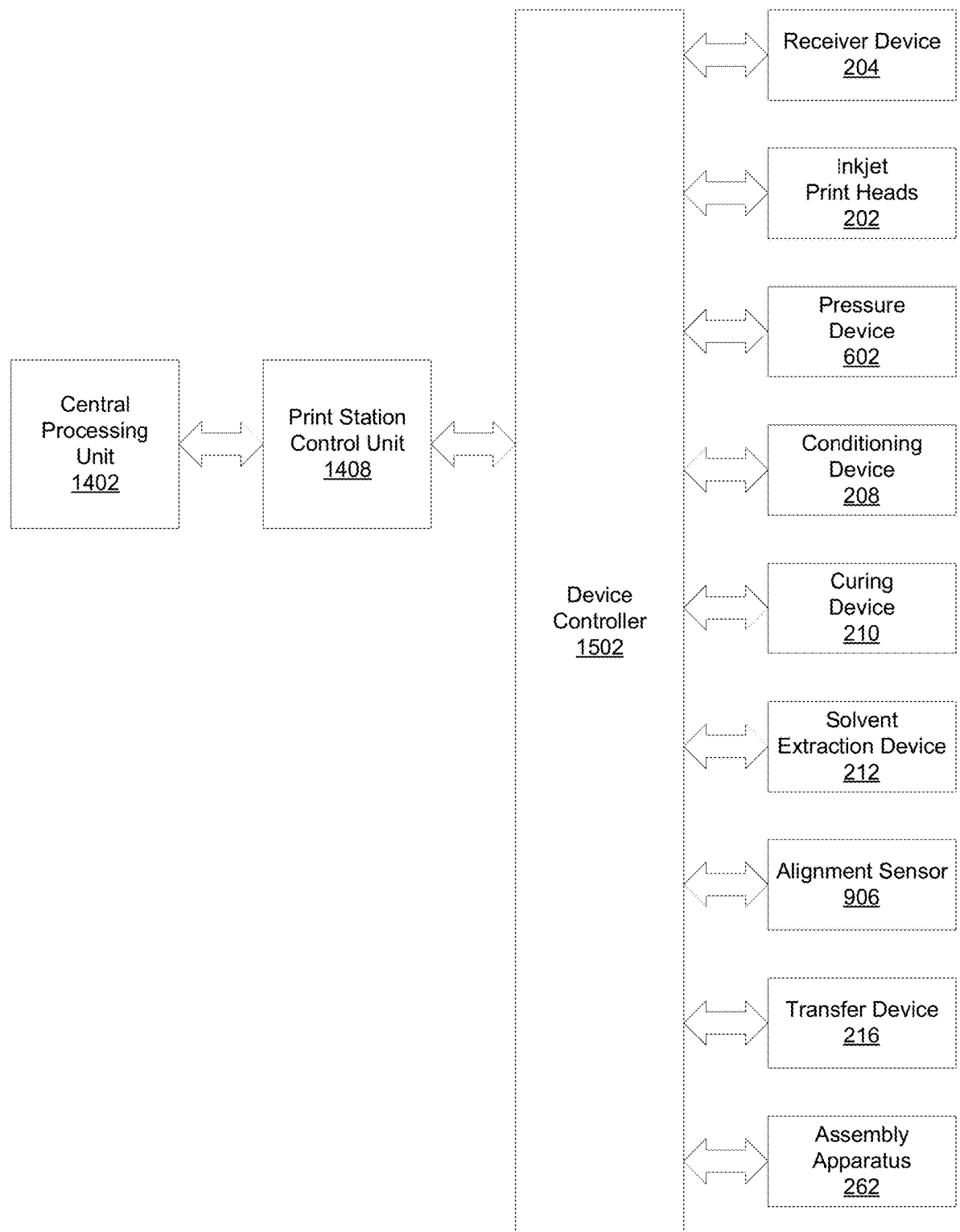
FIG. 15 is a schematic of a print station controller for use with a 3D inkjet printer.

Each one of print heads 202 deposits a predetermined quantity of inkjet ink onto receiver device 204 in a predetermined pattern of voxels, as directed by a print station controller described below in connection with FIG. 15. The predetermined pattern of voxels of each one of the plurality of print heads 202 may be separated from all of the voxel patterns from any other ones of the plurality of print heads 202, or it may partially or completely overlap the voxel pattern of any other one or all of the rest of the plurality of print heads 202. The result may be a complete printed layer 304 of a predetermined pattern of a plurality of ink types on the receiver device 204. It will be understood that a "complete" pattern of ink may not cover 100% of receiver device 204, depending on the part to be printed and any subsequent processing of the layer.

Receiver device 204 may be moved in a direction of travel using printer drive motor 256 (step 106) such that printed layer 304 may be juxtaposed with vacuum liquid extraction device 206. Vacuum liquid extraction device 206 may then be evacuated to cause low viscosity constituents of ink making up printed layer 304 to be partially or completely removed from printed layer 304, thereby drying the layer. Fluid pressure may also be applied in the optional upper portion of liquid extraction device 206 to assist liquid removal, as further discussed below in connection with FIG. 6-FIG. 8.

As shown at step 110 in FIG. 1, receiver device 204 may be moved in a direction of travel such that printed layer 304 may be juxtaposed with conditioning device 208, further described below. Before, after, or instead of conditioning printed layer 304, receiver device may also move printed layer 304 adjacent to curing device 210, which may be used to cure printed layer 304 as described below. Before or after either of these steps, printed layer 304 may be moved to additional fluid removal device 212, which may remove further carrier fluid not extracted during previous steps.

After printed layer 304 has been dried and optionally conditioned and/or cured, receiver device 204 may move it to build plate 214, where transfer device 216 may be used to transfer it to build plate 214. As used herein, a "transfer device" includes any apparatus for moving a printed layer to an assembly apparatus. The first printed layer 304 may be transferred directly to build plate 214, while subsequent layers may be placed atop it to create a stack 218 of printed layers.

Receiver device 204 may be provisioned with a printer drive motor 256 such that (under control of a print station control unit), the receiver device 204 may be moved in a direction of travel. The plurality of print heads 202 may be positioned such that the nozzles of each one of the plurality of print heads 202 form one or more substantially straight lines, and that the straight lines of the nozzles in all of the plurality of print heads 202 are juxtaposed parallel to each other. In an implementation of the present application, the plurality of print heads may be aligned such that the parallel rows of nozzles are aligned perpendicular to the direction of travel of the receiver device 204 and that the nozzles may extend substantially the full width of receiver device 204. The plurality of print heads 202 may be provisioned with a transport device to allow the plurality of print heads 202 to traverse a length of receiver device 204 to create a predetermined pattern of voxels on receiver device 204.

In some implementations of the present application, the plurality of print heads may be fixed across the width of receiver device 204 and receiver device 204 may be caused to move in a direction of travel such that the plurality of print heads may deposit a predetermined pattern of ink, in voxels, on a length of receiver device 204. In other implementations, the parallel rows of nozzles may be aligned parallel to the direction of movement of the receiver device 204. In such a case, the plurality of print heads 202 may be provisioned with a transport device to allow the plurality of print heads 202 to traverse the width of the receiver device 204 to create a predetermined pattern of a plurality of inks, in voxels, on receiver device 204. Whatever the configuration of print heads 202, they may collectively deposit a layer of ink which will be referred to as printed layer 304.

Figure 4:
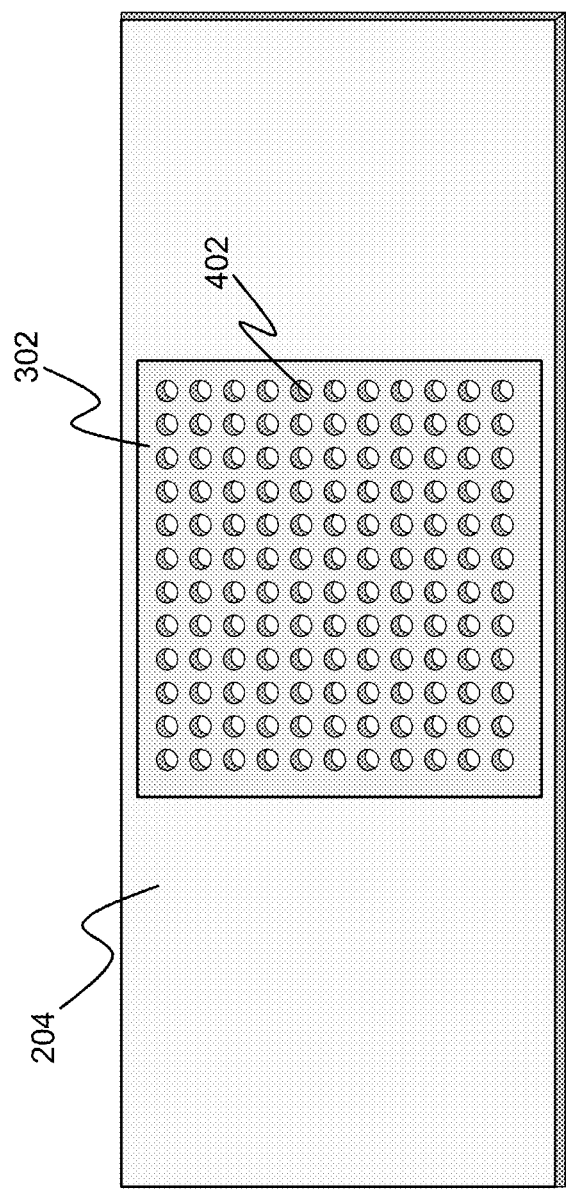
FIG. 4 is a top-down view of a receiver device as shown in FIG. 3 including a plurality of apertures.

Receiver device 204 may include a permeable membrane 302, illustrated in FIG. 3, at least partially permeable to low viscosity liquids, for example liquids with viscosity less than about 2 cP, 4 cP, 6 cP, 8 cP, 10 cP, or 12 cP. As may be seen in FIG. 4, permeable membrane 302 may include a metal, metal alloy, or other material that further includes an array of penetrating apertures 402 that may communicate between two major surfaces of the permeable membrane 302. For convenience in the following description, the surface of membrane 302 upon which ink is deposited will be referred to as the "top," and the opposite surface will be referred to as the "bottom," but it will be understood that receiver device 204 and permeable membrane 302 may be oriented in any convenient direction. Penetrating apertures 402 are illustrated as cylinders in FIG. 4 but may have another regular or irregular shape.

Figure 5:
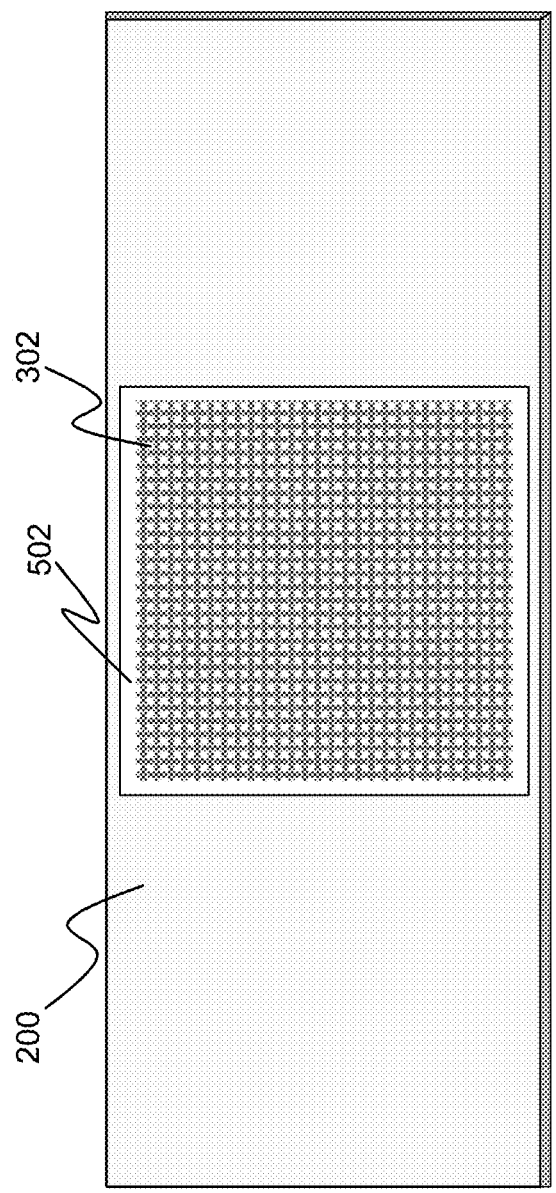
FIG. 5 is a top-down view of a receiver device as shown in FIG. 3 including a fibrous material.

In other implementations, permeable membrane 302 may also include a woven or nonwoven fibrous material which may exhibit a porous characteristic to liquids with lower viscosities but a nonporous characteristic to higher viscosity liquids and particles. For example, in one implementation, liquids with viscosities of less than about 12 cP may pass through membrane 302 while liquids with higher viscosities do not substantially pass through the membrane. It will be understood that another threshold value for liquid viscosity may be used as described above. Receiver device 204 may also include a support frame 502 as shown in FIG. 5, which may provide mechanical support to permeable membrane 302. Support frame 502 may include a metal such as an iron alloy or a copper alloy. Support frame 502 may also include a polymeric material or a composite of a polymeric material and a fibrous material, such as carbon fiber, fiberglass, or an organic fiber. Support frame 502 may include a composite of polymeric materials and a metal or metal alloy. In some implementations, support frame 502 may exhibit a continuous sheet like structure which may be provided with apertures in which permeable membrane 302 may be installed. In other implementations, support frame 502 may be a discrete window frame like structure which surround permeable membrane 302. In any of these implementations, support frame 502 may be a separate structure or it may be affixed to permeable membrane 302.

Receiver device 204 may be configured to move permeable membrane 302 away from print heads 202 after a printed layer 304 has been deposited thereon, for example through the action of printer drive motor 256. Printed layer 304 may be moved to a solvent extraction device 206, where a pressure differential may be used to dry printed layer 304. By moving printed layer 304 away from print heads 202 before drying, the 3D printer may print another printed layer in parallel with the drying process.

Solvent extraction device 206 may include a vacuum chamber 310, which may include a vacuum tight enclosure and a liquid-permeable support 312. In some implementations, solvent extraction device 206 may also be provided with a connection to a vacuum source (not shown). In some implementations, for example as shown below in FIG. 6-FIG. 8, instead of or in addition to applying a vacuum to the bottom of printed layer 304, a solvent extraction system may apply a pressure differential by applying a positive pressure to a top surface of printed layer 304.

Immediately after printed layer 304 has been deposited on permeable membrane 302, it may include a substantial amount of low viscosity liquid, for example as much as 90% by volume. After printed layer 304 (on permeable membrane 302) has been positioned in contact with vacuum liquid extraction device 206, vacuum chamber 310 may be evacuated by an attached vacuum source to create a pressure differential across printed layer 304. The pressure differential across printed layer 304 may cause a substantial amount (for example as much as 90%) of the low viscosity liquid in the layer to be forced through permeable support 312 and into vacuum chamber 310, thereby transforming printed layer 304 into a dried layer for subsequent processing as described below.

Figure 6:
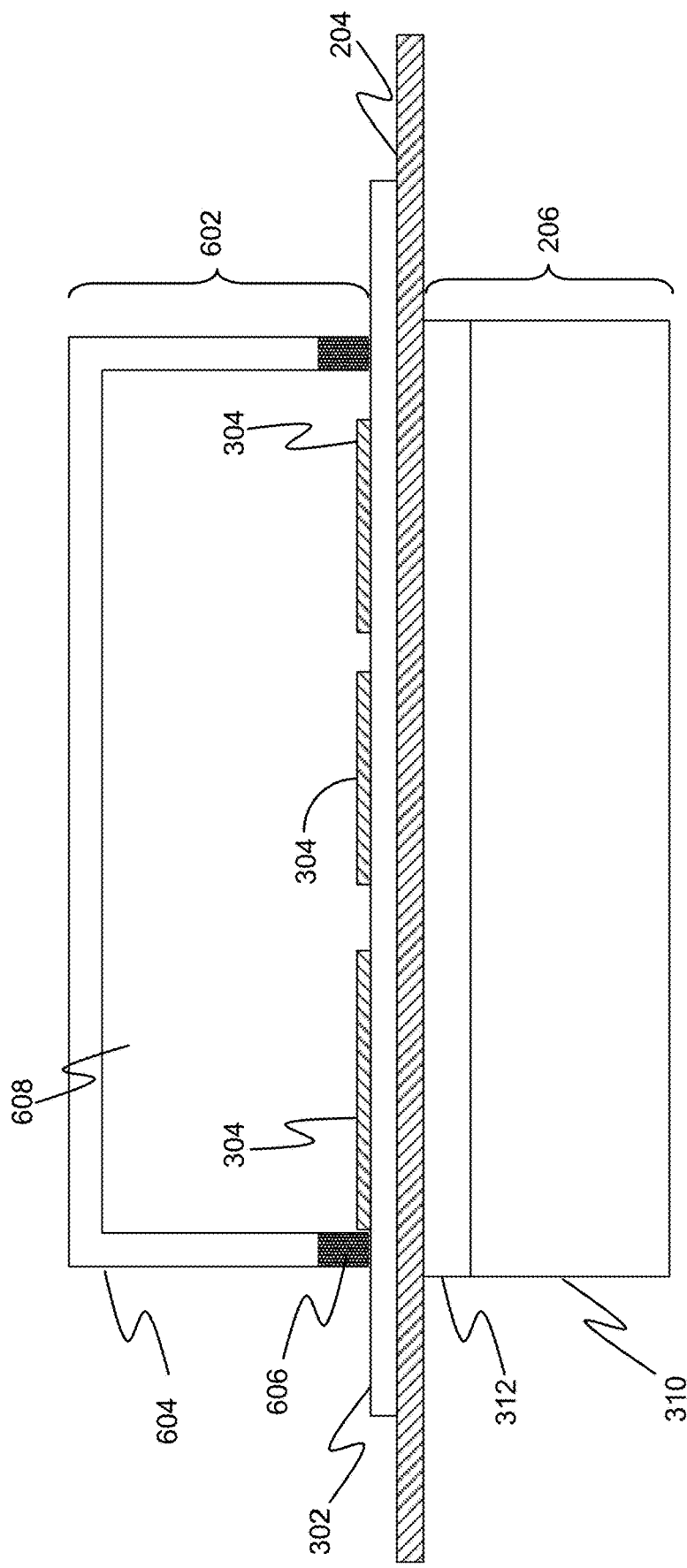
FIG. 6 is a drawing of a pressure-assisted system for solvent removal.
Figure 7:
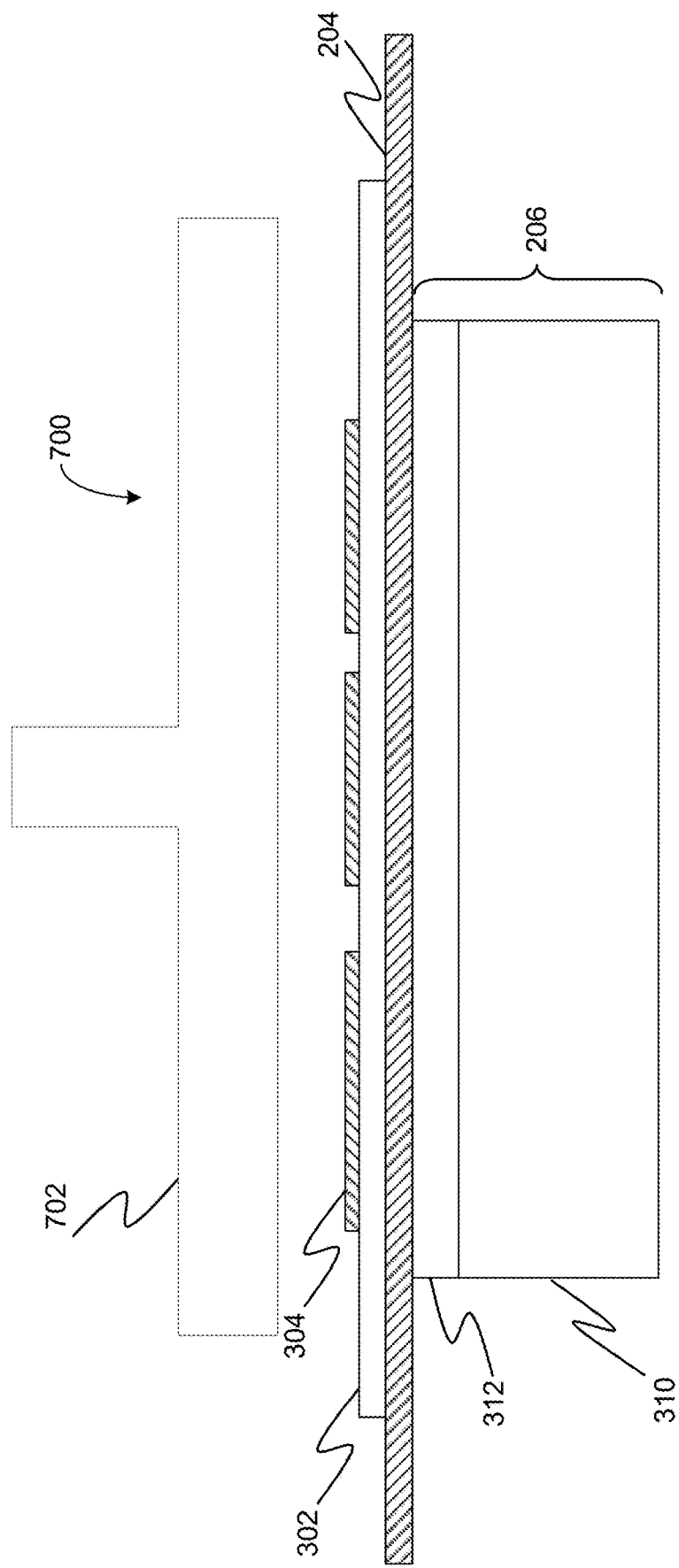
FIG. 7 is a drawing of a pressure plate for solvent removal.
Figure 8:
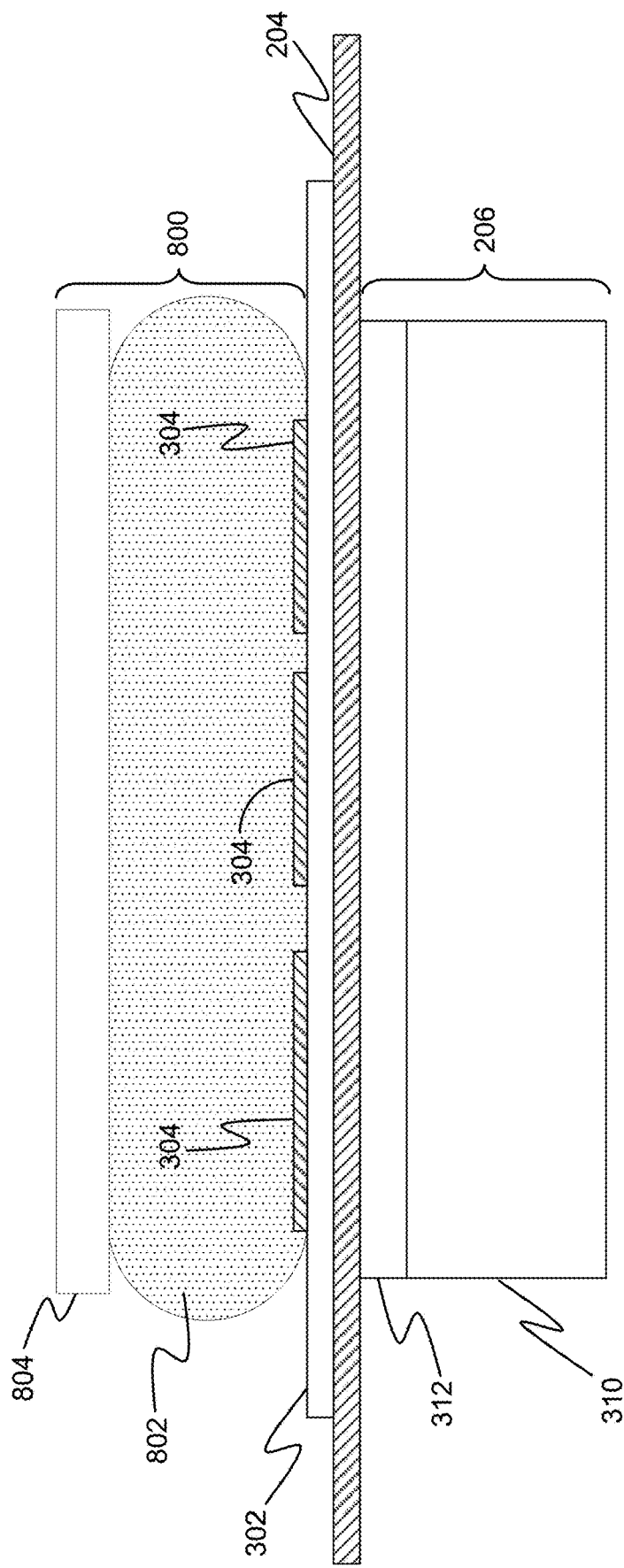
FIG. 8 is a drawing of a pressure cuff for solvent removal.

With reference to FIG. 6-FIG. 8, in certain implementations of the present teachings, liquid extraction may be augmented by a pressure device 602, 700, 800 positioned opposite liquid extraction device 206 at the top of printed layer 304, opposite permeable membrane 302.

Pressure Chamber Assisted Fluid Extraction

FIG. 6 illustrates fluid pressure device 602 to apply a fluid pressure to the surface of printed layer 304 opposite permeable membrane 302 to enhance the extraction of low viscosity liquid from printed layer 304. Fluid pressure device 602 may include a pressure chamber wall 604 and compliant seal 606 to contain an elevated pressure within pressure chamber 608 relative to ambient pressure. After printed layer 304 on permeable membrane 302 has been positioned in contact with vacuum liquid extraction device 206 with a seal created by compliant seal 606, the pressure within pressure chamber 608 may be elevated above ambient in coordination with the pressure in vacuum chamber 310 being reduced below ambient, thus increasing the total force to remove low viscosity liquids from printed layer 304. The fluid used to apply pressure to printed layer 304 in fluid pressure device 602, may include a gas such as air, nitrogen, argon, oxygen, steam, or gaseous compounds or combination of gasses. In some implementations, the fluid used to apply pressure to printed layer 304 in fluid pressure device 602, may include a liquid rather than a gas. Whether it is liquid, gaseous, or a mixture, the fluid used to apply pressure to printed layer 304 in the fluid pressure device 602 may also facilitate modification of the constituents of printed layer 304 in order to adjust the final properties of the printed materials, for example by reacting with materials at the surface or below the surface of printed layer 304.

Pressure Plate Assisted Fluid Extraction

In another implementation of the present application, a pressure plate device 700, illustrated in FIG. 7, may be employed to enhance the removal of low viscosity liquid from printed layer 304. When printed layer 304 is positioned in contact with vacuum liquid extraction device 206, pressing device 702 may be applied with a pressure against printed layer 304 in coordination with evacuating vacuum chamber 310 to enhance the force applied to extract low viscosity liquid from printed layer 304.

Pressure Cuff Assisted Fluid Extraction

In another implementation of the present application, a pressure cuff device 800, illustrated in FIG. 8, may be employed to enhance the removal of low viscosity liquid from printed layer 304. Pressure cuff device 800 may include an inflatable pressure cuff 802 and a cuff mounting 804. When printed layer 304 is positioned adjacent to vacuum liquid extraction device 206 (opposite receiver device 204), pressure cuff 802 may be inflated to exert a pressure against printed layer 304 in coordination with evacuating vacuum chamber 310 to enhance the force applied to extract low viscosity liquid from printed layer 304.

Conditioning Device

Returning to FIG. 2, after liquid has been partially or completely removed from printed layer 304 by the actions of vacuum liquid extraction device 206, receiver device 204 may be caused to transport printed layer 304 on permeable membrane 302 in a direction of travel (driven by printer drive motor 256) to an optional conditioning device 208. The exact steps for conditioning a specific material may vary depending on the physical and chemical properties of the powder component of the ink and the target properties of the material after any post printing step. In some implementations, conditioning may include a compaction step, for example to increase the density of the printed layer to 30% to 70% of theoretical density. In some implementations, compaction may include a settling step such as a vibratory action applied to the layer to cause particles to settle and pack together. In another implementation, compaction may include pressing particles together with a force normal to the layer surface.

Conditioning device 208 may include a compaction device, such as illustrated calender rolls, or alternatively another means of applying pressure such as a pressure cuff device (not shown). Conditioning device 208 is configured to increase the compacted density of the materials of dried printed layer 304, for example to at least 30% of theoretical density. Conditioning device 208 may also include apparatus to enhance or enable other processes to be carried out by later stages of the printing system, such as applying a coating to enhance the effectiveness of curing device 210 described below. Conditioning device 208 may also perform a surface conditioning action on dried printed layer 304 to enhance the transfer of dried printed layer 304 to a stack of previously transferred layers 218, as described below in connection with FIG. 9-FIG. 12, or to enhance adhesion of successive layers. Conditioning device 208 may further include a heater device, which may in some implementations act to evaporate a remaining portion of liquid vehicle from the printed layer.

Conditioning may also include an action to improve the properties of printed layer 304 such as robustness or uniformity or the ability of printed layer 304 to adhere to build plate 214 or to the top of the stack of previously transferred layers 218. Conditioning may also include a step of reducing a packing density of particles of printed layer 304. Such actions may include heating or cooling printed layer 304. In a further implementation, the nature of conditioning device 208 may be selected to suit a conditioning requirement of printed layer 304. For example, conditioning device 208 may apply a radiation such a RF radiation, X-ray radiation, or ultraviolet radiation to effect a change in a property of a binder phase of unconditioned printed layer 304, thereby controlling the physical properties of the printed layer 304. Printed layer 304 may be further conditioned by changing the electrostatic state of printed layer 304 to improve the ability to transfer printed layer 304 receiving device 204 to build plate 214, or to the top of the stack of previously transferred layers 218. Such an electrostatic exposure may cause the adhesion of printed layer 304 to be modified such that when printed layer 304 is brought into contact with build plate 214, or to the top of the stack of previously transferred layers 218, the adhesion of printed layer 304 to receiving device 204 is lower than the adhesion of printed layer 304 to build plate 214, or to the top of the stack of previously transferred layers 218. Thus the transfer of printed layer 304 to build plate 214, or to the top of the stack of previously transferred layers 218 may be facilitated.

Curing Device

As shown in FIG. 2, an optional curing device 210 may be provided. Curing device 210 may be positioned downstream from the conditioning device 208 and/or downstream from solvent extraction device 206 along the direction of travel. Curing device 210 may be configured to solidify binding material in the ink, thereby fixing the ink into a functionally robust solid pattern. Curing device 210 may include a source of radiant energy that may interact with the binding material to cause it to become solid. In some implementations, the radiant energy can be IR radiation, UV radiation, electron beam, or other known radiation types. Alternatively or in addition, curing device 210 may include a heat source. It should be understood that the curing device 210 does not need to be limited to the disclosed radiation types, as this list is presented for exemplary implementations and not intended to be exhaustive.

Additional Fluid-Removal Device

As shown in FIG. 2, an optional fluid removal device 212 may be provided. Fluid removal device 212 may include a heating device or other fluid removal device such as the vacuum chamber described above in connection with FIG. 6 to completely or partially remove any remaining low viscosity liquid from the dried printed layer.

Downstream of fluid removal device 212 in the illustration of FIG. 2, a transfer device 216 may be provided. Transfer device 216 serve to transfer dried printed layer 304 from receiver device 204 directly to a build plate 214 or to the top of a stack of previously transferred dried printed layers 218, as further discussed below in connection with FIG. 9-FIG. 12.

Roller Transfer Device

Figure 9:
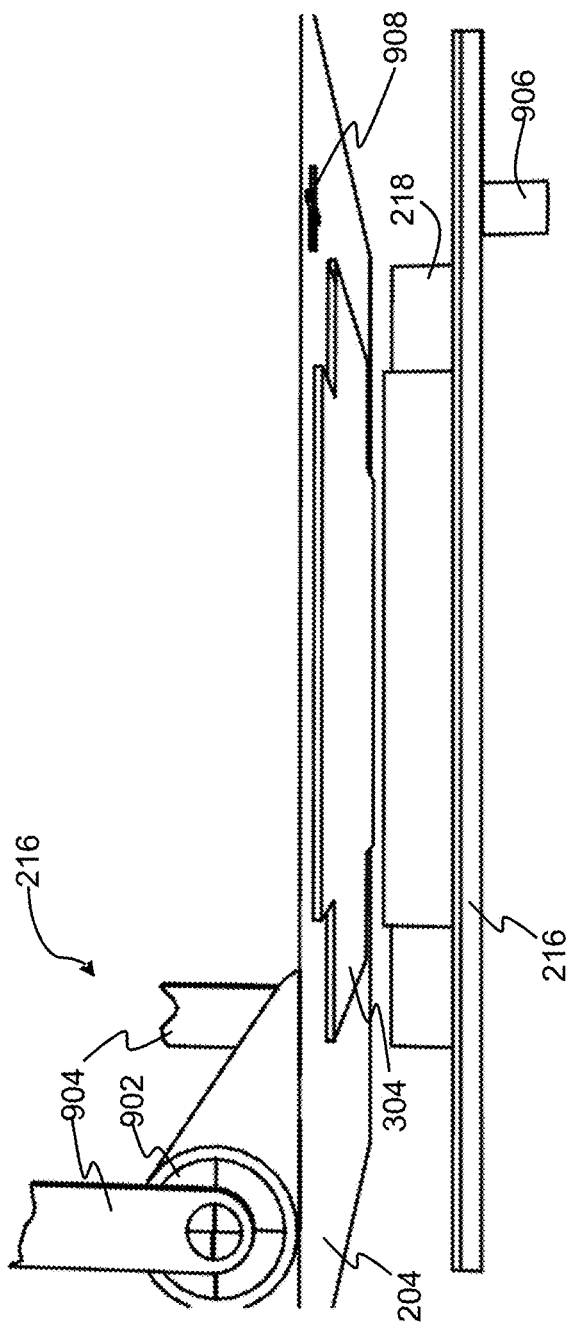
FIG. 9 is a drawing of a roller transfer device.

In one implementation of the transfer device 216 as shown in FIG. 9, the transfer device 216 includes a roller 902 and a carrier 904 to support and move roller 902 vertically. In some implementations, the carrier may be a two-axis carrier 904 to move roller 904 vertically and horizontally relative to receiver device 204. Vertical movement of the two-axis carrier 904 may deflect receiver device 204 and cause printed object 304 to make pressure contact with build plate 214 or the top of a stack of previously transferred printed layers 218. A horizontal movement of two-axis carrier 904 may then cause a progressively moving line contact moving in a predetermined direction from a one end of printed layer 304 to another end of printed layer 304. The moving line contact across printed layer 304 can transfer printed layer 304 to build plate 214 or the top of a stack of previously transferred printed layers 218.

Articulating Transfer Device

Figure 10:
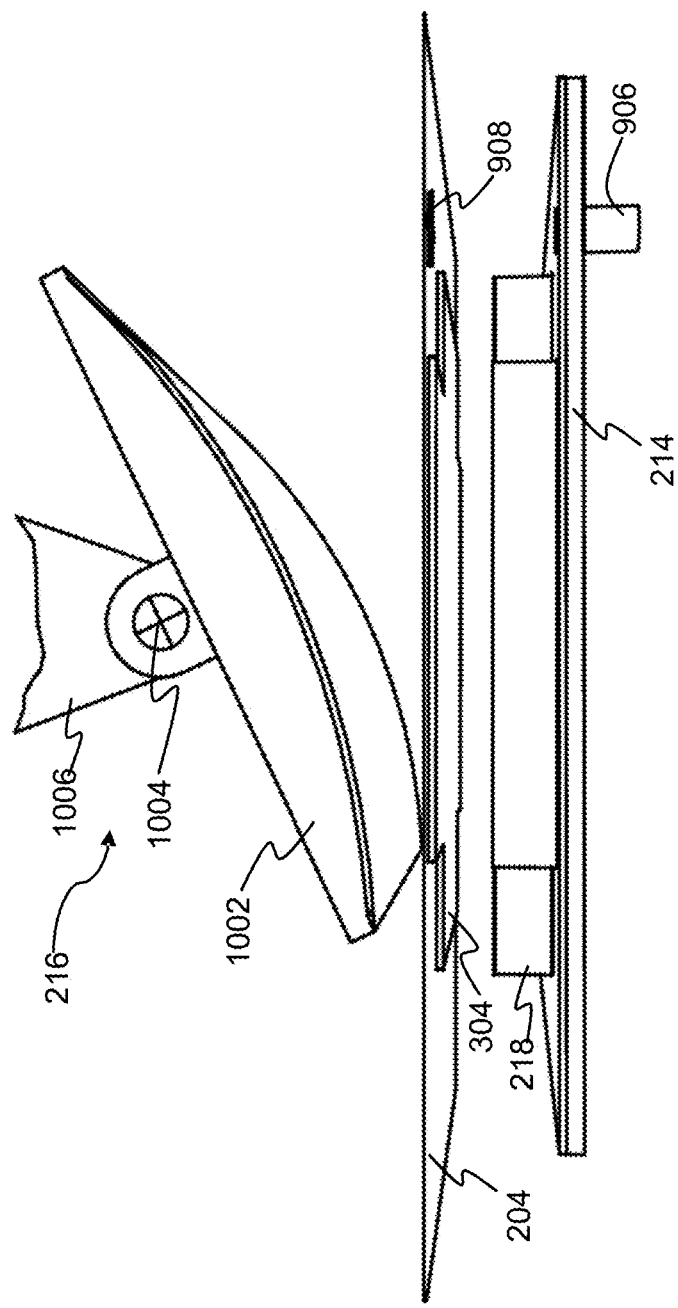
FIG. 10 is a drawing of an articulating transfer device.

In another implementation, as shown in FIG. 10, the transfer device 216 may be provided with a shaped pressing device 1002 and an articulating device 1004. Transfer device 216 can also be provided with a two-axis carrier 1006 which may provide horizontal and vertical movement of shaped pressing device 1002. Under the control of print station control unit (described below), the vertical and horizontal movement of shaped pressing device 1002 may cause receiver device 204 to be deflected vertically and for printed layer 304 to come into contact, with a pressure, to build plate 214 or the top of a stack of previously transferred printed layers 218. Coordinating further vertical and horizontal movement of two-axis carrier 1006 with articulating device 1004 can cause the entire shaped surface of shaped pressing device 1002 to progressively come into line contact, with pressure, to receiver device 204. The progressive line contact to receiver device 204 may cause deflection of receiver device 204 to cause progressive line contact between printed layer 304 and with build plate 214 or the top of a stack of previously transferred printed layers 218. The progressive line contact between printed layer 304 and build plate 214 or the top of a stack of previously transferred printed layers 218 being sufficient to transfer printed layer 304 to build plate 214 or the top of a stack of previously transferred printed layers 218.

Pressing Device

Figure 11:
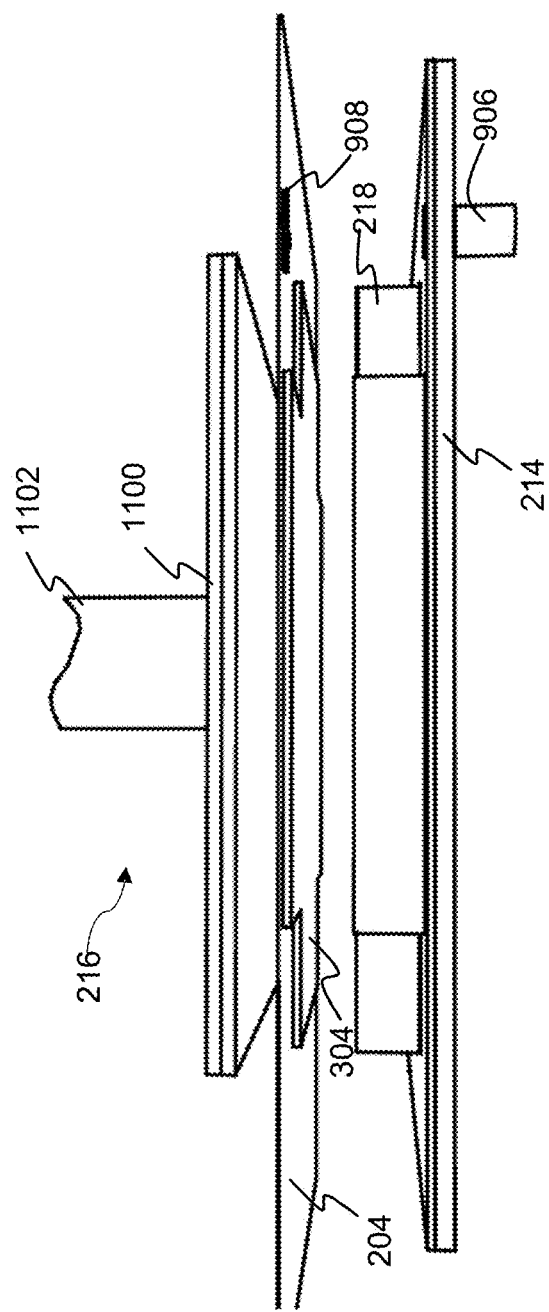
FIG. 11 is a drawing of a flat pressing transfer device.

In another implementation, transfer device 216 may include a pressing device 1100, as shown in FIG. 11. Pressing device 1100 can be provided with single-axis carrier 1102 to provide vertical movement of pressing device 1100. The vertical movement of pressing device 1100 may cause receiver device 204 to be deflected vertically and for printed layer 304 to come into contact, with a pressure, to build plate 214 or the top of a stack of previously transferred printed layers 218.

Shape Modifier Device

Figure 12:
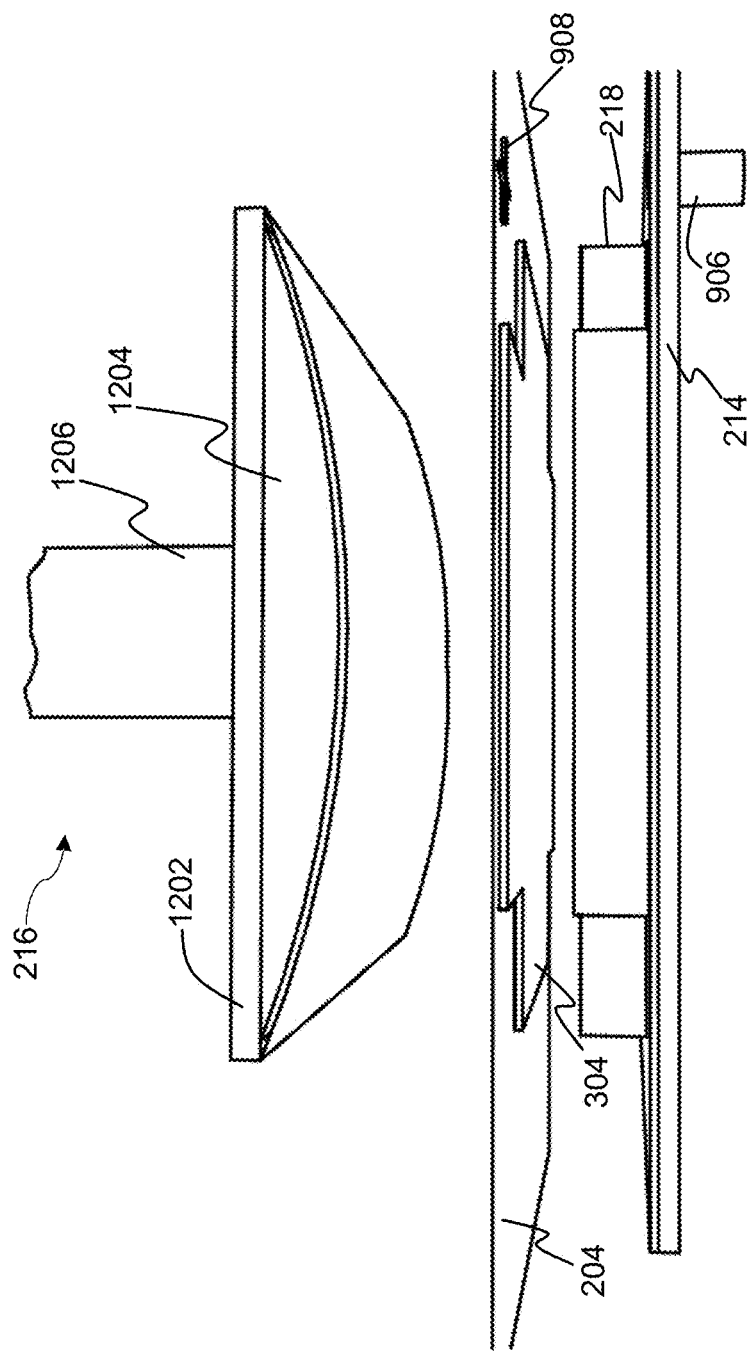
FIG. 12 is a drawing of a curved pressing transfer device.

In another implementation, as shown in FIG. 12, transfer device 216 may be provided with a pressing device 1202 and a shape modifier device 1204. Transfer device 216 can also be provided with a single-axis carrier 1206 which may provide vertical movement of pressing device 1202. The vertical movement of pressing device 1202 may cause receiver device 204 to be deflected vertically and for printed layer 304 to come into contact, with a pressure, to build plate 214 or the top of a stack of previously transferred printed layers 218. Shape modifier 1204 may include a preformed shaped structure which may include an elastic material that may be flattened by mechanical pressure applied normal to the shaped surface. As single axis carrier 1206 brings printed object into contact with build plate 214 or the top of a stack of previously transferred printed layers 218, shape modifier 1204 can progressively flatten and thus progressively bring printed object 304 into contact with build plate 214 or the top of a stack of previously transferred printed layers 218. The progressively moving contact between build plate 214 or the top of a stack of previously transferred printed layers 218 may assure a uniform attachment between printed object 304 and build plate 214 or the top of a stack of previously transferred printed layers 218.

Adhesion Modifier Device

Any of the above-described transfer devices 216 shown in FIG. 9-FIG. 12 may further include an adhesion modifier device. The adhesion modifier device may adjust the adhesion strength of printed layer 304 to receiver device 204 to facilitate the release of printed layer 304 to build plate 214 or the top of a stack of previously transferred printed layers 218. The adhesion modifier device may further modify the adhesion of printed layer 304 to the surface of build plate 214 or the top of a stack of previously transferred printed layers 218 such that the adhesive strength between a printed layer 304 and receiver device 204 is less than the adhesive strength between a printed layer 304 and build plate 214 or the top of a stack of previously transferred printed layers 218. Adhesion modifier device may act upon the interface between receiver device 204 and printed layer 304 by applying a stimulus to receiver device 204 or printed layer 304, or both. The application of the stimulus can facilitate a reduction in adhesion of printed layer 304 to receiver device 204. The stimulus causing an adjustment of adhesion from adhesion modifier may be, but is not limited to a thermal stimulus, an electrical stimulus, a radiation stimulus, a magnetic stimulus, a mechanical stimulus or a particle beam stimulus.

Assembly Apparatus

An assembly apparatus 262, portions of which are illustrated in FIG. 2, may include an X-Y positioner device 230 and a build station 260. As used herein, an "assembly apparatus" includes any system capable of receiving printed objects from a plurality of transfer modules in such a way as to assemble printed layers and printed parts according to a predetermined design. Build station 260 may include a build plate 214. A Z axis positioner device 264 may be provided which may adjust the vertical position of build plate 214 to maintain the level of the top of previously transferred printed layers 218 at a predetermined vertical position to facilitate proper transfer of a printed layer 304 to build plate 214 or the top of a stack of previously transferred layers 218.

Build plate 214 may include an adhesion reducing device (not shown) to facilitate removal of the completed stack of printed objects from the build plate 214 in step 118. The adhesion reducing device may be activated to reduce the adhesion of the stack of previously transferred layers 218 by an applied stimulus. The stimulus which may cause adhesion reducing device to release the stack of previously transferred layers 218, may be a thermal stimulus, a radiant stimulus, a magnetic stimulus a chemical stimulus an electrical stimulus or a mechanical stimulus.

Alignment System

With reference to FIG. 9-FIG. 12, build plate 214 may further include an alignment sensor 906. Printed layer 304 may include one or more alignment fiducials 908 which may interact with one or more alignment sensors 906 to precisely align the printed object 304 with the build plate 214 or with the top of a stack of previously transferred printed objects. Alignment sensor 906 may interact with alignment fiducial 908 in the UV spectrum, in the visual spectrum, in the IR spectrum, magnetically, or mechanically. In some implementations, in conjunction with computer system 1400, alignment sensors 906 may detect the position of alignment fiducials 908 to within 0.01 mm of actual position and cause build plate 214 to be positioned within 0.01 mm of a predetermined position relative to alignment fiducials 908.

Assembly Apparatus Positioner

As shown in FIG. 2, an assembly apparatus may include an X-Y positioner device 230 and a build station 260. Build station 260 may also include a Z positioner device and build plate 214. In some implementations, build station 260 may interact with build plate 214 and X-Y positioner device 230 to cause build plate 214, at the command of computer system 1400, to be positioned to within 0.01 mm of a predetermined position relative to transfer device 216 of any one of the plurality of transfer devices comprising a multi-material multi-module printer system.

X-Y positioner device 230 may include a computer-controlled X-Y movement system. The movement system may be but is not limited to an orthogonally connected pair of linear actuators or a planar X-Y linear motor. Build station 260 may be in communication with the X-Y movement system such that build station 260 may be moved to any point within the limits of the X-Y positioner device 230. The X-Y movement system may be scaled such that assembly station 260 may be moved to, and accurately positioned to accept a printed layer transferred from transfer apparatus 216 of any of the plurality of transfer devices associated with the printer system. The X-Y positioner device 230 may further be scaled to allow assembly station 260 to move to an unload position, clear of all printer modules associated with the printer. The clearance from associated modules may be provided in the X-Y plane or by separation orthogonal to the X-Y plane. Build station 260 can further be provided with a rotational movement system to provide rotational alignment of build plate 214 with transfer device 216.

In another implementation, precise location of build plate 214 may be provided by a hexapod that can provide movement along the X, Y and Z axis as well as rotation about at least one axis.

Once all printed layers have been transferred to the assembly apparatus, in some implementations, the 3D printer may apply heat, radiation, pressure, or other appropriate methods to cause the stacked layers to adhere to one another to form the printed part. For example, heat may be applied at the final stage (or before the final stage) to sinter adjacent layers to one another. In other implementations, the stacked layers may adhere to one another to form the finished part without such post-processing treatment, or the part may be sintered into its final form after being removed from the assembly apparatus.

Multi-Method 3D Printer System

Figure 13:
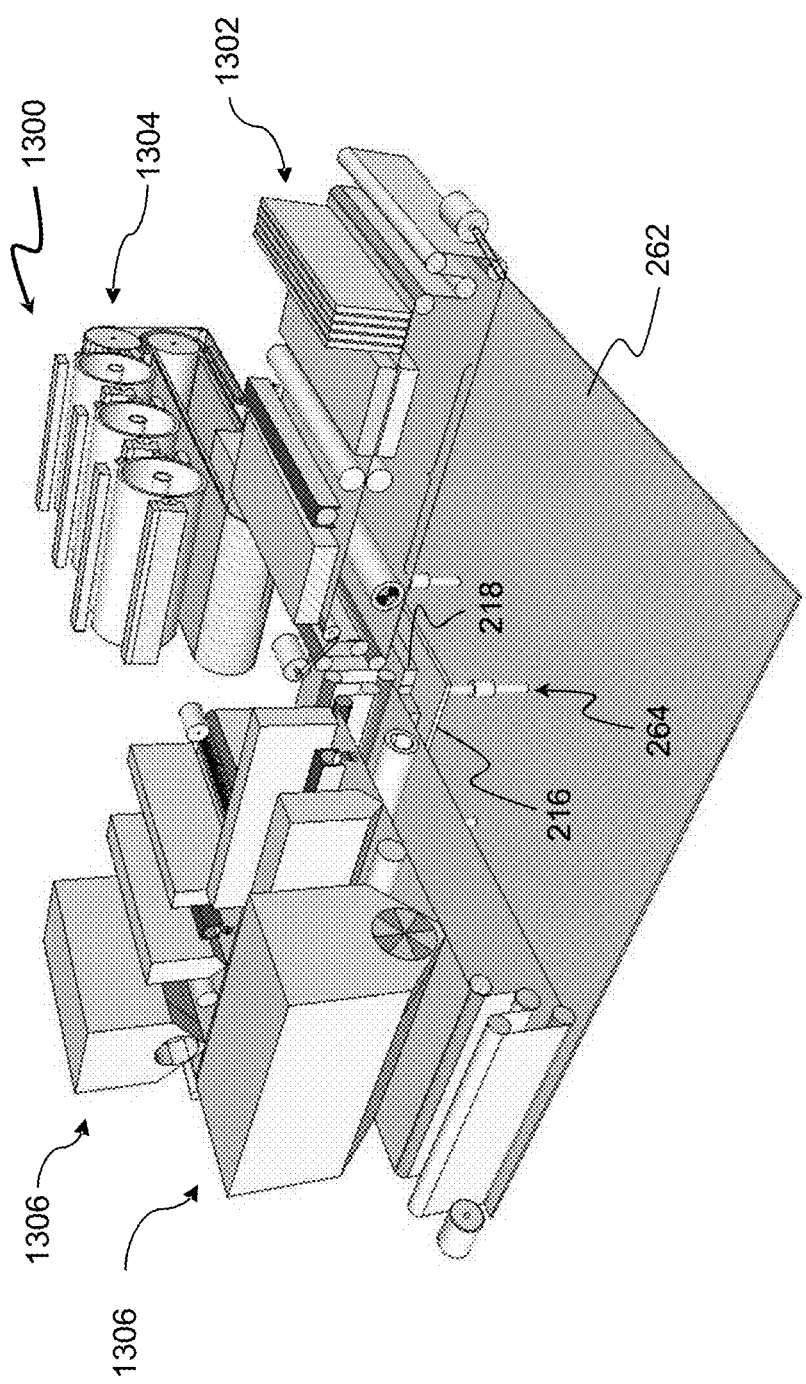
FIG. 13 is a drawing of a multi-method 3D printer system.

FIG. 13 illustrates one implementation of a multi-method 3D printer system 1300. FIG. 13 shows four printer modules 1302, 1304, 1306 and four transfer apparatus associated with an assembly apparatus. As used herein, a "printer module" includes a patterning and deposition system capable of creating a printed object on a receiver device. The four printer modules may all implement different patterning and deposition techniques. A jetted material printer module 1302 such as an inkjet printer module may include the components discussed above, for example in FIG. 2. Printer module 1304 is represented as an electrophotographic 3D printer, and printer modules 1306 are represented as jetted material printers. Multi-method printer system 1300 may include printer modules based on 3D printing technology other than those illustrated, such as laminated object manufacturing or selective laser melting, fused deposition modeling, or other suitable 3D printing methods.

FIG. 13 illustrates a printer system with four printer modules/transfer apparatus aligned at right angles to adjacent modules, with their proximal ends toward the center of the X-Y positioner device 230. It is understood that this configuration is not limited to four printer modules A and could include two printer modules, three printer modules, or more than four printer modules. It is further understood that a printed part removal area may be provided by horizontal separation at any open space on X-Y positioner device 230 or may be provided by vertical separation of assembly station 260 from printer modules A and transfer modules B. It is further understood that alignment of adjacent modules may be parallel rather than orthogonal. Other potential configurations will be clear to those skilled in the art.

As shown in FIG. 13, the multi-material multi-method 3D printer 1300 includes a plurality of printer modules with associated transfer apparatus integrated by an assembly apparatus. Each printer module may be capable of adjustment of operating parameters such as print thickness, binder concentration, binder type, and material type. While adjustment of operating parameters may significantly affect properties of the final printed object, each printer module typically creates printed objects based on one specific method. A non-exhaustive list of examples of potential methods includes jetted binder printing, electrophotographic printing, off-set printing, and jetted material printing. The method to create a given printed object may be chosen based on the capabilities of the separate methods such as practical thickness range, minimum feature size, precision, and print rate.

While most printing methods may be compatible with one or more material, the basic materials may require specific preparation for use with specific methods.

In practice, a multi-material, multi-method 3D printer may be configured with one printer module for each combination of printer method and materials required in a final manufactured part. In one implementation, at least one of the plurality of printer modules making up a multi-method 3D printer system may be quickly and easily replaced with another module, as required for a specific final part. In another implementation, a multi-method 3D printer may be integrated into one combined unit capable of using different methods to print different layers of any given part.

As explained above, implementations of the present disclosure are directed to 3D printer systems include a plurality of printer modules that may each be associated with one of a plurality of transfer devices, all of which may be coordinated with an assembly apparatus. A central computer system may coordinate the operation of all the components of the 3D printer system, as shown below in FIG. 14. The plurality of printer modules may include printer modules employing at least two different deposition and patterning techniques, and each one of the plurality of printer module may be configured to create printed objects either of one material or of multiple materials. Each printer module may create printed objects with a different material, some printer module may use the same material, or all of the printer modules of a 3D multi-method printer system may use the same material. Printer modules, with associated transfer devices, may be configured to be easily joined with or removed from assembly apparatus, allowing for easy custom configuration of the printer to match the build requirements.

When a multi-method 3D printer as shown in FIG. 13 is used, jetted material 3D printing module 1302 may have a build plate 214 where successive inkjet printed layers may be stacked as described above, or, alternatively, a central build plate may be used for stacking layers from multiple printing modules. Jetted material module 1302 may coordinate with other printer modules 1304, 1306 to assemble a printed part including portions made of stacked inkjet printed layers and other portions made by other methods, such as jetted binder portions produced by printer modules 1306.

In one implementation, an inkjet 3D printing module 1302 may include a receiver device including a substrate, an inkjet print head configured to deposit an ink including a suspension of a particulate material in a liquid vehicle onto the substrate to form a printed layer, a removal system configured to use a pressure differential to remove a portion of the liquid vehicle from the printed layer to form a dried layer, and a transfer system configured to transfer the dried layer to a build station.

Material Types

The material types for printing may be broadly classified in two basic categories: robust materials and fugitive materials.

Robust materials are those that survive a post printing processing step to become the non-compressible voxels of the final printed part. The robust materials may survive a post processing step identical in composition and structure to the material as it was when printed.

Examples of such materials include ceramics such as alumina that start as $Al_2O_3$ powder and survive a post printing sintering process as a high density mass of $Al_2O_3$, or a metal such as stainless steel alloy powder which survives a post printing sintering process as a solid mass with the same alloy content as it started with.

A robust material may also start as precursors of the final material. A post printing process may cause the precursors of a robust material to react to create a new chemical compound or to change the phase or to change crystal types of the precursors. An example of such a material is aluminum powder that may be converted to alumina during a post printing heat treatment in a controlled oxidizing atmosphere, or powdered glasses used in ceramming processes, where the glass is converted to a crystal during a sintering process.

A fugitive material is one that can occupy voxels within a printed part that are designed to be occupied by a gas or a vacuum immediately after a post processing step. A fugitive material may include a solid or semi-solid material during the printing process, and during the process of assembling printed layers into a printed part. During a post processing step, a fugitive material is converted into a format that can easily escape from a printed part such as a gas or a liquid. The result of including a contiguous mass of voxels of fugitive material within a volume of robust material is a cavity of a predetermined configuration, after a post processing step. The cavity may be in communication with the outside of the printed part via a predesigned passage or may be completely sealed. A sealed cavity may be occupied by a predetermined gas or a vacuum. Examples of fugitive materials include organic materials such as polyethylene or polyethylene oxide, which decompose into $CO_2$ and water at temperatures below 450° C., or carbon powders, which can be oxidized to $CO_2$ at substantially higher temperatures by controlling the heat treat atmosphere. As the fugitive materials are converted to gas, the gases may escape the structure prior to the robust materials sintering into a dense mass.

Pattern Generation

As described above, inkjet 3D printing module 1302 is configured to create structures of one or more materials in complex three-dimensional patterns wherein the structure is built up in layers, each layer including one or more materials. The pattern of each material in each layer may be generated in a manner similar to pattern generation for each layer of a conventional 3D printer. Specifically, the patterns for each layer may be derived from a slice of the whole structure through the use of CAD software like SolidWorks. Unlike conventional 3D printers, the computer system 1400 may separate the pattern included in design file 1406, input into computer system 1400 via input device 1404, of each layer into more than one material.

Figure 14:
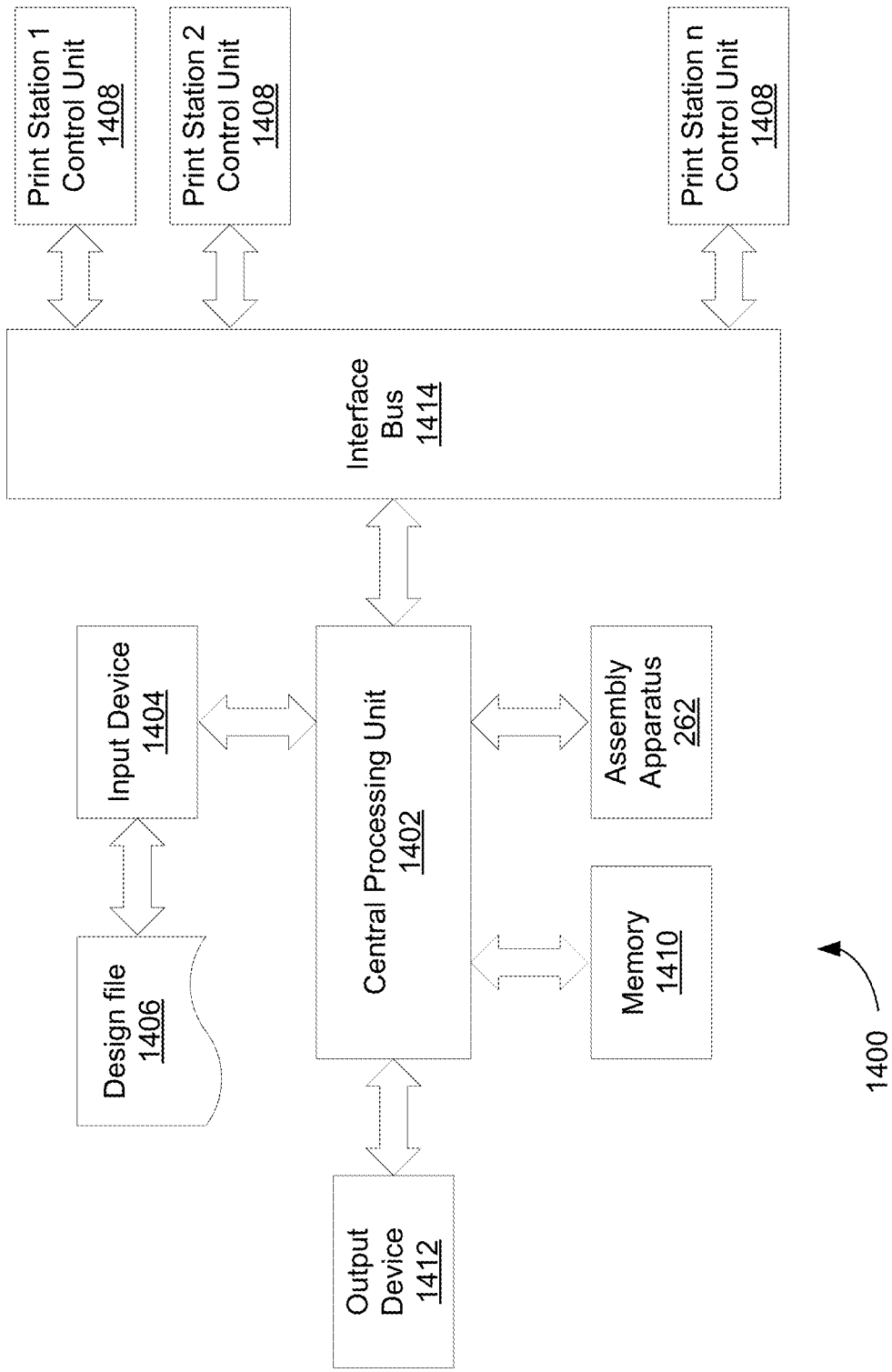
FIG. 14 is a diagram of a computer system that may control a 3D inkjet printer.

Computer system 1400 for controlling the 3D inkjet printer of FIG. 2 is illustrated in FIG. 14. Central processing unit (CPU) 1402 communicates with input device 1404, which may be supplied with a design file 1406. In some implementations, a user may create design file 1406 using CAD software or the like, either on computer system 1400 or on another computer. In other implementations, a user may receive a design file from a file repository, such as Thingiverse, Pinshape, or other file-sharing sites, or from a commercial vendor of 3D designs. CPU 1402 may store design file 1406 or intermediate calculations for control of the print station control units 1408 in memory 1410, and may communicate with the user via output device 1412.

CPU 1402 may communicate through interface bus 1414 with a plurality of print station control units 1408 to control dispensing of ink from inkjet print heads 202 as discussed above and other functions of the print station control units 1408. As shown in FIG. 15, print station control units 1408 may communicate via a device controller 1502 with receiver device 204, inkjet print heads 202, pressure device 602, conditioning device 208, curing device 210, solvent extraction device 212, alignment sensor 906, transfer device 216, and assembly apparatus 262 (which may include X-Y positioner 230 and build station 260), controlling each of these devices in order to deposit ink as specified by design file 1406 as interpreted by CPU 1402. CPU 1402 may receive state information and sensor information, and may send control signals, to any of these devices using control signaling systems that are known in the art, in order to facilitate printing as described herein.

Figure 16:
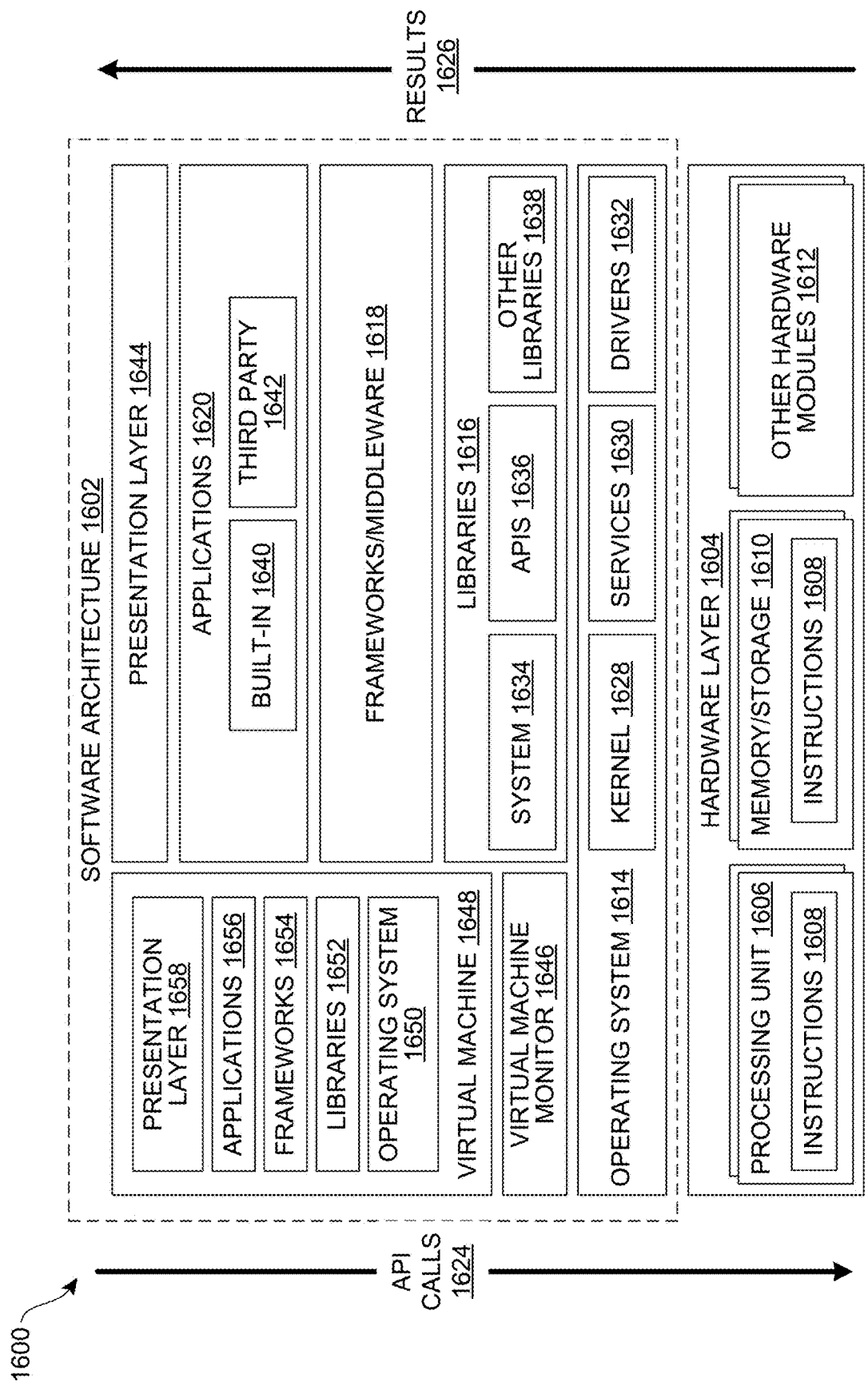
FIG. 16 is a block diagram of an example computing device, which may be used to provide implementations of the systems and methods described herein.

FIG. 16 is a block diagram 1600 illustrating an example software architecture 1602, various portions of which may be used in conjunction with various hardware architectures herein described, which may implement any of the above-described features. FIG. 16 is a non-limiting example of a software architecture and it will be appreciated that many other architectures may be implemented to facilitate the functionality described herein. The software architecture 1602 may execute on hardware such as the central processing unit 1402 that may include, among other things, document storage, processors, memory, and input/output (I/O) components. A representative hardware layer 1604 is illustrated and can represent, for example, the devices described herein. The representative hardware layer 1604 includes a processing unit 1606 and associated executable instructions 1608. The executable instructions 1608 represent executable instructions of the software architecture 1602, including implementation of the methods, modules and so forth described herein. The hardware layer 1604 also includes a memory/storage 1610, which also includes the executable instructions 1608 and accompanying data. The hardware layer 1604 may also include other hardware modules 1612. Instructions 1608 held by processing unit 1608 may be portions of instructions 1608 held by the memory/storage 1610.

The example software architecture 1602 may be conceptualized as layers, each providing various functionality. For example, the software architecture 1602 may include layers and components such as an operating system (OS) 1614, libraries 1616, frameworks 1618, applications 1620, and a presentation layer 1644. Operationally, the applications 1620 and/or other components within the layers may invoke API calls 1624 to other layers and receive corresponding results 1626. The layers illustrated are representative in nature and other software architectures may include additional or different layers. For example, some mobile or special purpose operating systems may not provide the frameworks/middleware 1618.

The OS 1614 may manage hardware resources and provide common services. The OS 1614 may include, for example, a kernel 1628, services 1630, and drivers 1632. The kernel 1628 may act as an abstraction layer between the hardware layer 1604 and other software layers. For example, the kernel 1628 may be responsible for memory management, processor management (for example, scheduling), component management, networking, security settings, and so on. The services 1630 may provide other common services for the other software layers. The drivers 1632 may be responsible for controlling or interfacing with the underlying hardware layer 1604. For instance, the drivers 1632 may include display drivers, camera drivers, memory/storage drivers, peripheral device drivers (for example, via Universal Serial Bus (USB)), network and/or wireless communication drivers, audio drivers, and so forth depending on the hardware and/or software configuration.

The libraries 1616 may provide a common infrastructure that may be used by the applications 1620 and/or other components and/or layers. The libraries 1616 typically provide functionality for use by other software modules to perform tasks, rather than rather than interacting directly with the OS 1614. The libraries 1616 may include system libraries 1634 (for example, C standard library) that may provide functions such as memory allocation, string manipulation, file operations. In addition, the libraries 1616 may include API libraries 1636 such as media libraries (for example, supporting presentation and manipulation of image, sound, and/or video data formats), graphics libraries (for example, an OpenGL library for rendering 2D and 3D graphics on a display), database libraries (for example, SQLite or other relational database functions), and web libraries (for example, WebKit that may provide web browsing functionality). The libraries 1616 may also include a wide variety of other libraries 1638 to provide many functions for applications 1620 and other software modules.

The frameworks 1618 (also sometimes referred to as middleware) provide a higher-level common infrastructure that may be used by the applications 1620 and/or other software modules. For example, the frameworks 1618 may provide various graphic user interface (GUI) functions, high-level resource management, or high-level location services. The frameworks 1618 may provide a broad spectrum of other APIs for applications 1620 and/or other software modules.

The applications 1620 include built-in applications 1640 and/or third-party applications 1642. Examples of built-in applications 1640 may include, but are not limited to, a contacts application, a browser application, a location application, a media application, a messaging application, and/or a game application. Third-party applications 1642 may include any applications developed by an entity other than the vendor of the particular platform. The applications 1620 may use functions available via OS 1614, libraries 1616, frameworks 1618, and presentation layer 1644 to create user interfaces to interact with users.

Some software architectures use virtual machines, as illustrated by a virtual machine 1648. The virtual machine 1648 provides an execution environment where applications/modules can execute as if they were executing on a hardware machine. The virtual machine 1648 may be hosted by a host OS (for example, OS 1614) or hypervisor, and may have a virtual machine monitor 1646 which manages operation of the virtual machine 1648 and interoperation with the host operating system. A software architecture, which may be different from software architecture 1602 outside of the virtual machine, executes within the virtual machine 1648 such as an OS 1650, libraries 1652, frameworks 1654, applications 1656, and/or a presentation layer 1658.

Figure 17:
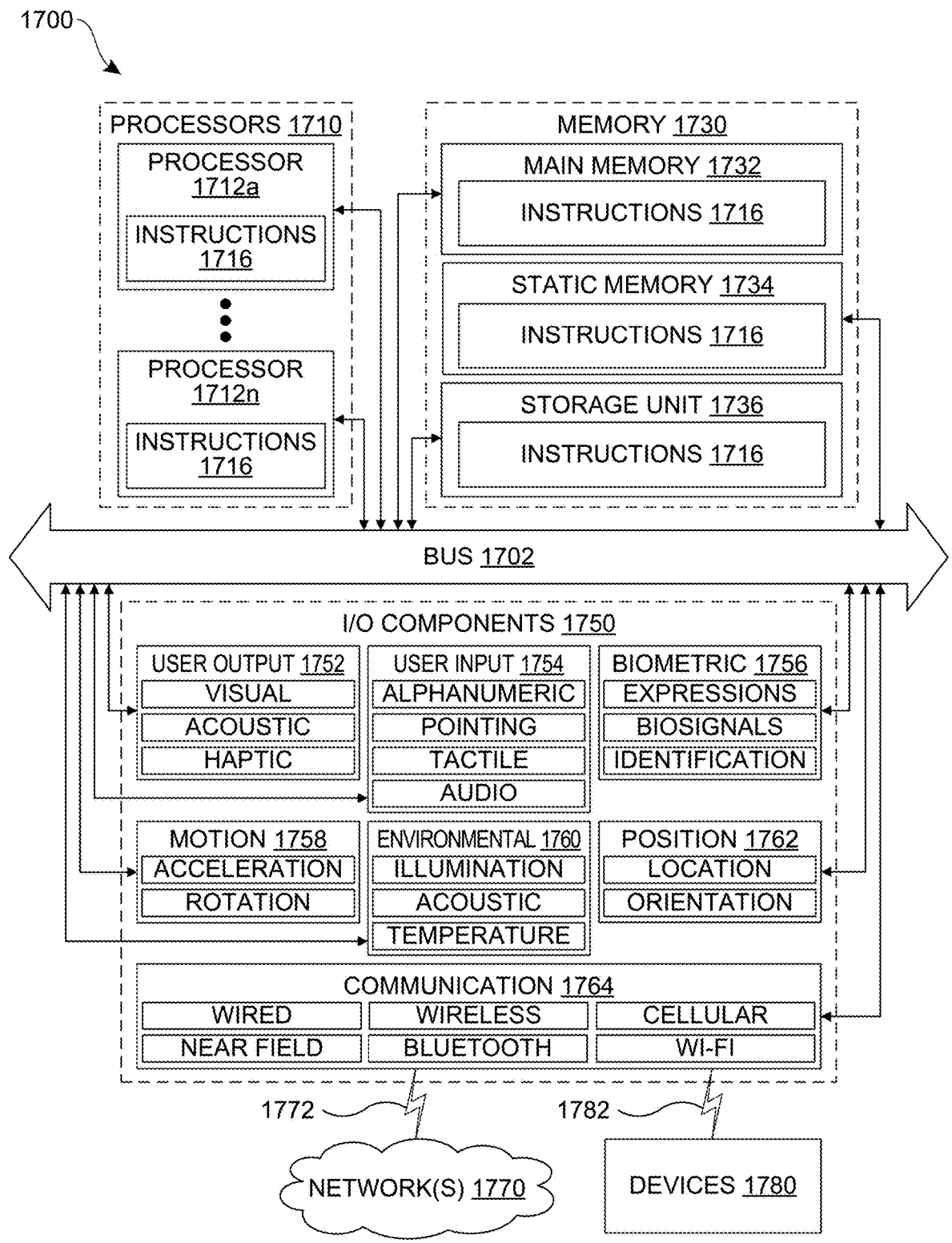
FIG. 17 is a block diagram illustrating components of an example machine configured to read instructions from a machine-readable medium.

FIG. 17 is a block diagram illustrating components of an example machine 1700 configured to read instructions from a machine-readable medium (for example, a machine-readable storage medium) and perform any of the features described herein. The example machine 1700 is in a form of a computer system, within which instructions 1716 (for example, in the form of software components) for causing the machine 1700 to perform any of the features described herein may be executed. As such, the instructions 1716 may be used to implement modules or components described herein. The instructions 1716 cause unprogrammed and/or unconfigured machine 1700 to operate as a particular machine configured to carry out the described features. The machine 1700 may be configured to operate as a standalone device or may be coupled (for example, networked) to other machines. In a networked deployment, the machine 1700 may operate in the capacity of a server machine or a client machine in a server-client network environment, or as a node in a peer-to-peer or distributed network environment.

Machine 1700 may be embodied as, for example, a server computer, a client computer, a personal computer (PC), a tablet computer, a laptop computer, a netbook, a set-top box (STB), a gaming and/or entertainment system, a smart phone, a mobile device, a wearable device (for example, a smart watch), and an Internet of Things (IoT) device. Further, although only a single machine 1700 is illustrated, the term "machine" includes a collection of machines that individually or jointly execute the instructions 1716.

The machine 1700 may include processors 1710, memory 1730, and I/O components 1750, which may be communicatively coupled via, for example, a bus 1702. The bus 1702 may include multiple buses coupling various elements of machine 1700 via various bus technologies and protocols. In an example, the processors 1710 (including, for example, a central processing unit (CPU), a graphics processing unit (GPU), a digital signal processor (DSP), an ASIC, or a suitable combination thereof) may include one or more processors 1712a to 1712n that may execute the instructions 1716 and process data. In some examples, one or more processors 1710 may execute instructions provided or identified by one or more other processors 1710. The term "processor" includes a multi-core processor including cores that may execute instructions contemporaneously. Although FIG. 17 shows multiple processors, the machine 1700 may include a single processor with a single core, a single processor with multiple cores (for example, a multi-core processor), multiple processors each with a single core, multiple processors each with multiple cores, or any combination thereof. In some examples, the machine 1700 may include multiple processors distributed among multiple machines.

The memory/storage 1730 may include a main memory 1732, a static memory 1734, or other memory, and a storage unit 1736, both accessible to the processors 1710 such as via the bus 1702. The storage unit 1736 and memory 1732, 1734 store instructions 1716 embodying any one or more of the functions described herein. The memory/storage 1730 may also store temporary, intermediate, and/or long-term data for processors 1710. The instructions 1716 may also reside, completely or partially, within the memory 1732, 1734, within the storage unit 1736, within at least one of the processors 1710 (for example, within a command buffer or cache memory), within memory at least one of I/O components 1750, or any suitable combination thereof, during execution thereof. Accordingly, the memory 1732, 1734, the storage unit 1736, memory in processors 1710, and memory in I/O components 1750 are examples of machine-readable media.

As used herein, "machine-readable medium" refers to a device able to temporarily or permanently store instructions and data that cause machine 1700 to operate in a specific fashion. The term "machine-readable medium," as used herein, does not encompass transitory electrical or electromagnetic signals per se (such as on a carrier wave propagating through a medium); the term "machine-readable medium" may therefore be considered tangible and non-transitory. Non-limiting examples of a non-transitory, tangible machine-readable medium may include, but are not limited to, nonvolatile memory (such as flash memory or read-only memory (ROM)), volatile memory (such as a static random-access memory (RAM) or a dynamic RAM), buffer memory, cache memory, optical storage media, magnetic storage media and devices, network-accessible or cloud storage, other types of storage, and/or any suitable combination thereof. The term "machine-readable medium" applies to a single medium, or combination of multiple media, used to store instructions (for example, instructions 1716) for execution by a machine 1700 such that the instructions, when executed by one or more processors 1710 of the machine 1700, cause the machine 1700 to perform and one or more of the features described herein. Accordingly, a "machine-readable medium" may refer to a single storage device, as well as "cloud-based" storage systems or storage networks that include multiple storage apparatus or devices.

The I/O components 1750 may include a wide variety of hardware components adapted to receive input, provide output, produce output, transmit information, exchange information, capture measurements, and so on. The specific I/O components 1750 included in a particular machine will depend on the type and/or function of the machine. For example, mobile devices such as mobile phones may include a touch input device, whereas a headless server or IoT device may not include such a touch input device. The particular examples of I/O components illustrated in FIG. 17 are in no way limiting, and other types of components may be included in machine 1700. The grouping of I/O components 1750 are merely for simplifying this discussion, and the grouping is in no way limiting. In various examples, the I/O components 1750 may include user output components 1752 and user input components 1754. User output components 1752 may include, for example, display components for displaying information (for example, a liquid crystal display (LCD) or a projector), acoustic components (for example, speakers), haptic components (for example, a vibratory motor or force-feedback device), and/or other signal generators. User input components 1754 may include, for example, alphanumeric input components (for example, a keyboard or a touch screen), pointing components (for example, a mouse device, a touchpad, or another pointing instrument), and/or tactile input components (for example, a physical button or a touch screen that provides location and/or force of touches or touch gestures) configured for receiving various user inputs, such as user commands and/or selections.

In some examples, the I/O components 1750 may include biometric components 1756, motion components 1758, environmental components 1760, and/or position components 1762, among a wide array of other possible sensor components. The biometric components 1756 may include, for example, components to detect body expressions (for example, facial expressions, vocal expressions, hand or body gestures, or eye tracking), measure biosignals (for example, heart rate or brain waves), and identify a person (for example, via voice-, retina-, and/or facial-based identification). The motion components may include, for example, acceleration and/or rotation sensors for various components of the 3D printer. The environmental components may include, for example, light sensors (for example, photodiodes, photoresistors, or phototransistors), acoustic sensors (for example, piezoelectric sensors or acoustic wave sensors), or temperature sensors (for example, thermocouples or thermistors), which may sense environmental conditions for various locations in the 3D printer. The position components 1762 may include, for example, location sensors (for example, a Global Position System (GPS) receiver), altitude sensors (for example, an air pressure sensor from which altitude may be derived), and/or orientation sensors (for example, magnetometers).

The I/O components 1750 may include communication components 1764, implementing a wide variety of technologies operable to couple the machine 1304 to network(s) 1770 and/or device(s) 1780 via respective communicative couplings 1772 and 1782. The communication components

1764 may include one or more network interface components or other suitable devices to interface with the network(s) 1770. The communication components 1764 may include, for example, components adapted to provide wired communication, wireless communication, cellular communication, Near Field Communication (NFC), Bluetooth communication, Wi-Fi, and/or communication via other modalities. The device(s) 1780 may include other machines or various peripheral devices (for example, coupled via USB).

In some examples, the communication components 1764 may detect identifiers or include components adapted to detect identifiers. For example, the communication components 1764 may include Radio Frequency Identification (RFID) tag readers, NFC detectors, optical sensors (for example, one- or multi-dimensional bar codes, or other optical codes), and/or acoustic detectors (for example, microphones to identify tagged audio signals). In some examples, location information may be determined based on information from the communication components 1762, such as, but not limited to, geo-location via Internet Protocol (IP) address, location via Wi-Fi, cellular, NFC, Bluetooth, or other wireless station identification and/or signal triangulation.

In the following, further features, characteristics and advantages of the instant application will be described by means of items:

Item 1: A three-dimensional (3D) printer, including a receiver device including a substrate; an inkjet print head configured to deposit an ink including a suspension of a particulate material in a liquid vehicle onto the substrate to form a printed layer; a removal system configured to use a pressure differential to remove a portion of the liquid vehicle from the printed layer to form a dried layer; and a transfer system configured to transfer the dried layer to a build station.

Item 2: The 3D printer of item 1, wherein the substrate is permeable, and the removal system is configured to evacuate a space on a side of the substrate opposite to the printed layer.

Item 3: The 3D printer of item 1 or 2, wherein the substrate includes a perforated metal.

Item 4: The 3D printer of any of items 1-3, wherein the substrate includes a fibrous material.

Item 5: The 3D printer of any of items 1-4, wherein the removal system is configured to apply a pressure to a surface of the printed layer opposite the substrate.

Item 6: The 3D printer of any of items 1-5, wherein the removal system includes a pressure chamber.

Item 7: The 3D printer of any of items 1-6, wherein the removal system includes a pressure cuff.

Item 8: The 3D printer of any of items 1-7, wherein the removal system includes a pressure plate.

Item 9: The 3D printer of any of items 1-8, wherein the receiver device is configured to transport the printed layer away from the inkjet print head before removal of the liquid vehicle from the printed layer.

Item 10: The 3D printer of any of items 1-9, wherein the removal system is configured to remove the liquid vehicle during transport of the printed layer to the build station.

Item 11: The 3D printer of any of items 1-10, wherein the transfer system is configured to transfer the dried layer to a stack of printed layers in the build station.

Item 12: The 3D printer of any of items 1-11, wherein the ink includes a binder liquid, and the printer further comprises a curing system configured to cure the binder liquid to solidify it.

Item 13: The 3D printer of any of items 1-12, further including a conditioning device configured to condition the printed layer to increase a density of the particulate material in the printed layer.

Item 14: The 3D printer of any of items 1-13, wherein the conditioning system is configured to mechanically compress the particulate material in the printed layer.

Item 15: The 3D printer of any of items 1-14, wherein the conditioning system is further configured to apply a surface conditioning material to the dried printed layer.

Item 16: The 3D printer of any of items 1-15, wherein the build station includes an X-Y controller.

Item 17: The 3D printer of any of items 1-16, wherein the build station includes a Z-axis controller.

Item 18: The 3D printer of any of items 1-17, further comprising an additional printing module configured to form a printed layer on the substrate using a method other than inkjet printing.

Item 19: A method of three-dimensional (3D) printing, including depositing an ink onto a substrate with an inkjet print head to form a printed layer, the ink including a particulate material and a liquid vehicle, transporting the printed layer away from the inkjet print head, using a pressure differential to remove a portion of the liquid vehicle from the printed layer to form a dried printed layer, and transferring the dried printed layer to a build station to form a stack of printed layers.

Item 20: The method of item 19, wherein using a pressure differential to remove a portion of the liquid vehicle from the printed layer includes evacuating a space adjacent to the substrate opposite a side of the substrate upon which the printed layer has been deposited.

Item 21: The method of item 19 or 20, wherein using a pressure differential to remove a portion of the liquid vehicle from the printed layer includes applying pressure to a surface of the layer opposite the surface deposited onto the substrate.

Item 22: The method of any of items 19-21, wherein the step of transporting the printed layer away from the inkjet print head occurs before the step of using a pressure differential to form the dried printed layer.

Item 23: The method of any of items 19-22, further including conditioning the printed layer to increase a density of particulate material in the printed layer.

Item 24: The method of any of items 19-23, wherein the ink includes a liquid binder, the method further including curing the binder to transform it into a solid.

Item 25: An inkjet printer, including a receiver device including a substrate, an inkjet print head configured to deposit an ink including a suspension of a particulate material in a liquid vehicle onto the substrate to form a printed layer, and a removal system configured to use a pressure differential to remove a portion of the liquid vehicle from the printed layer.

While various implementations have been described, the description is intended to be exemplary, rather than limiting, and it is understood that many more implementations and implementations are possible that are within the scope of the implementations. Although many possible combinations of features are shown in the accompanying figures and discussed in this detailed description, many other combinations of the disclosed features are possible. Any feature of any implementation may be used in combination with or substituted for any other feature or element in any other implementation unless specifically restricted. Therefore, it will be understood that any of the features shown and/or discussed in the present disclosure may be implemented together in any suitable combination. Accordingly, the implementations are not to be restricted except in light of the attached claims and their equivalents. Also, various modifications and changes may be made within the scope of the attached claims.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various examples for the purpose of streamlining the disclosure. This method of disclosure is not to be interpreted as reflecting an intention that the claims require more features than are expressly recited in each claim. Rather, as the following claims reflect, inventive subject matter lies in less than all features of a single disclosed example. Thus the following claims are hereby incorporated into the Detailed Description, with each claim standing on its own as a separately claimed subject matter.

What is claimed is:

1. A method of three-dimensional (3D) printing, comprising:
   depositing an ink onto a substrate with an inkjet print head to form a printed layer, the ink including a particulate material and a liquid vehicle;
   transporting the printed layer away from the inkjet print head;
   removing a portion of the liquid vehicle from the printed layer via a vacuum applied to a lower surface of the printed layer while applying pressure to an upper surface of the printed layer via a pressure plate configured to physically contact the upper surface of the printed layer to form a dried printed layer; and
   transferring the dried printed layer to a build station to form a stack of printed layers.

2. The method of claim 1, wherein removing the portion of the liquid vehicle from the printed layer via the vacuum includes evacuating a space adjacent to the substrate.

3. The method of claim 2, wherein the space evacuated is opposite a side of the substrate upon which the printed layer has been deposited.

4. The method of claim 1, wherein transporting the printed layer away from the inkjet print head occurs before removing the portion of the liquid vehicle via the vacuum to form the dried printed layer.

5. The method of claim 1, further comprising conditioning the dried printed layer to increase a density of particulate material in the dried printed layer.

6. The method of claim 5, wherein conditioning the dried printed layer includes mechanically compressing the particulate material in the dried printed layer.

7. The method of claim 5, wherein conditioning the dried printed layer includes vibrating the dried printed layer to cause the particulate material to settle.

8. The method of claim 5, wherein conditioning the dried printed layer includes applying a surface conditioning material to the dried printed layer.

9. The method of claim 1, wherein the ink includes a liquid binder, the method further comprising curing the binder to transform it into a solid.

10. The method of claim 9, wherein curing the binder includes irradiating the printed layer.

11. The method of claim 9, wherein curing the binder is performed after removing-the portion of the liquid vehicle.

12. The method of claim 1, wherein removing the portion of the liquid vehicle from the printed layer includes using a pressure differential during transport of the printed layer to the build station.

13. A method of three-dimensional (3D) printing, comprising:
   depositing an ink onto a substrate with an inkjet print head to form a printed layer, the ink including a particulate material and a liquid vehicle; and
   removing a portion of the liquid vehicle from the printed layer via a vacuum applied to a lower surface of the printed layer while applying pressure to an upper surface of the printed layer via a pressure plate configured to physically contact the upper surface of the printed layer to form a dried printed layer.

14. The method of claim 13, further comprising transferring the dried printed layer to a build station to form a stack of printed layers.

15. The method of claim 13, further comprising transporting the printed layer away from the inkjet print head.

16. The method of claim 13, further comprising conditioning the dried printed layer to increase a density of particulate material in the dried printed layer.

17. The method of claim 13, wherein the ink includes a liquid binder, the method further comprising curing the binder to transform it into a solid.

* * * * *